(12) United States Patent
Okuma et al.

(10) Patent No.: US 12,202,070 B2
(45) Date of Patent: Jan. 21, 2025

(54) LASER MACHINING DEVICE AND LASER OUTPUT DEVICE

(71) Applicant: HAMAMATSU PHOTONICS K.K., Hamamatsu (JP)

(72) Inventors: Junji Okuma, Hamamatsu (JP); Mitsuhiro Nagao, Hamamatsu (JP); Yasunori Igasaki, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 0 days.

(21) Appl. No.: 16/072,626

(22) PCT Filed: Jan. 24, 2017

(86) PCT No.: PCT/JP2017/002315
§ 371 (c)(1),
(2) Date: Jul. 25, 2018

(87) PCT Pub. No.: WO2017/130953
PCT Pub. Date: Aug. 3, 2017

(65) Prior Publication Data
US 2019/0030644 A1 Jan. 31, 2019

(30) Foreign Application Priority Data

Jan. 28, 2016 (JP) .................... 2016-014496
Jan. 28, 2016 (JP) .................... 2016-014499
(Continued)

(51) Int. Cl.
*B23K 26/06* (2014.01)
*B23K 26/03* (2006.01)
(Continued)

(52) U.S. Cl.
CPC ........ *B23K 26/0643* (2013.01); *B23K 26/032* (2013.01); *B23K 26/064* (2015.10);
(Continued)

(58) Field of Classification Search
CPC ................ B23K 26/064; B23K 26/082; B23K 26/0643; B23K 26/0648; B23K 26/0869; B23K 26/0876; B23K 26/38; B23K 26/53
(Continued)

(56) References Cited

U.S. PATENT DOCUMENTS 3,467,474 A * 9/1969 Shifrin .................. B23K 26/21
356/138
6,040,553 A * 3/2000 Ross ...................... B23K 26/40
406/88

(Continued)

FOREIGN PATENT DOCUMENTS

CN 101712100 A 5/2010
CN 102227286 A 10/2011
(Continued)

OTHER PUBLICATIONS

Webster definition "Attach" (Year: 2022).*
International Preliminary Report on Patentability mailed Aug. 9, 2018 for PCT/JP2017/002315.

*Primary Examiner* — Sang Y Paik
*Assistant Examiner* — Bonita Khlok
(74) *Attorney, Agent, or Firm* — Faegre Drinker Biddle & Reath LLP

(57) ABSTRACT

A laser processing device includes: a device frame; a support unit attached to the device frame and configured to support an object to be processed; a laser output unit attached to the device frame; and a laser converging unit attached to the device frame so as to be movable with respect to the laser output unit. The laser output unit includes a laser light source configured to emit laser light, and the laser converging unit
(Continued)

includes: a reflective spatial light modulator configured to reflect the laser light while modulating the laser light; a converging optical system configured to converge the laser light at the object to be processed; and an imaging optical system constituting a double telecentric optical system in which a reflective surface of the reflective spatial light modulator and an entrance pupil plane of the converging optical system are in an imaging relationship.

6 Claims, 19 Drawing Sheets

(30) Foreign Application Priority Data

| Jan. 28, 2016 | (JP) | ................................ | 2016-014500 |
|---|---|---|---|
| Jan. 28, 2016 | (JP) | ................................ | 2016-014504 |
| Jan. 28, 2016 | (JP) | ................................ | 2016-014508 |
| Jan. 28, 2016 | (JP) | ................................ | 2016-014513 |

(51) Int. Cl.

| B23K 26/064 | (2014.01) |
|---|---|
| B23K 26/08 | (2014.01) |
| B23K 26/53 | (2014.01) |
| H01S 3/00 | (2006.01) |
| H01S 3/10 | (2006.01) |
| B23K 103/00 | (2006.01) |
| H01S 3/23 | (2006.01) |

(52) U.S. Cl.
CPC ...... *B23K 26/0648* (2013.01); *B23K 26/0884* (2013.01); *B23K 26/53* (2015.10); *H01S 3/005* (2013.01); *H01S 3/10061* (2013.01); *B23K 2103/56* (2018.08); *H01S 3/0071* (2013.01); *H01S 3/2391* (2013.01)

(58) Field of Classification Search
USPC ....... 359/379, 695, 365, 392, 405, 411, 412, 359/414, 416, 417, 418, 558, 744, 676, 359/682, 684, 686, 689, 694, 707, 715, 359/716, 721, 726, 733, 737, 741; 219/121.67, 121.72, 121.74, 121.83, 219/121.73–121.75, 121.78–121.8
See application file for complete search history.

(56) References Cited

U.S. PATENT DOCUMENTS

| 6,437,287 | B1* | 8/2002 | Offerhaus | ............ | B23K 26/032 |
| | | | | | 219/121.6 |
| 7,092,791 | B2* | 8/2006 | Terada | .................. | B23K 26/28 |
| | | | | | 901/41 |
| 2004/0226927 | A1* | 11/2004 | Morikazu | ............ | B23K 26/142 |
| | | | | | 219/121.84 |
| 2009/0245318 | A1 | 10/2009 | Clifford, Jr. | | |
| 2010/0321675 | A1* | 12/2010 | Huang | ................ | A61B 3/1025 |
| | | | | | 356/217 |
| 2011/0000897 | A1* | 1/2011 | Nakano | .............. | B23K 26/0006 |
| | | | | | 219/121.72 |
| 2011/0266261 | A1* | 11/2011 | Nakano | .................. | B23K 26/53 |
| | | | | | 219/121.6 |
| 2013/0064706 | A1* | 3/2013 | Schwarze | ............... | B22F 3/003 |
| | | | | | 419/1 |
| 2014/0333902 | A1* | 11/2014 | Aboshi | .............. | G02B 27/1033 |
| | | | | | 353/38 |
| 2016/0228988 | A1* | 8/2016 | Dallarosa | ............... | B23K 26/32 |
| 2016/0325376 | A1* | 11/2016 | Nakagawa | ......... | B23K 26/0876 |
| 2017/0304941 | A1* | 10/2017 | Usuda | ................ | B23K 26/0876 |

FOREIGN PATENT DOCUMENTS

| CN | 103447691 A | 12/2013 |
|---|---|---|
| CN | 103959045 A | 7/2014 |
| JP | H4-200892 A | 7/1992 |
| JP | H5-021463 U | 3/1993 |
| JP | H7-124776 A | 5/1995 |
| JP | H8-118057 A | 5/1996 |
| JP | 2000-202655 A | 7/2000 |
| JP | 3878758 B2 | 2/2007 |
| JP | 2010-075997 A | 4/2010 |
| JP | 2010-125507 A | 6/2010 |
| JP | 2010-155258 A | 7/2010 |
| JP | 2010-167458 A | 8/2010 |
| JP | 2011-25304 A | 2/2011 |
| JP | 2011-110567 A | 6/2011 |
| JP | 2011-251306 A | 12/2011 |
| JP | 2012-115897 A | 6/2012 |
| JP | 5456510 B2 | 4/2014 |
| JP | 2014-144485 A | 8/2014 |
| JP | 2014-147946 A | 8/2014 |
| JP | 2015-226012 A | 12/2015 |
| WO | WO 2008/053915 A1 | 5/2008 |
| WO | WO 2010/024320 A1 | 3/2010 |

\* cited by examiner

Fig.15
(a)
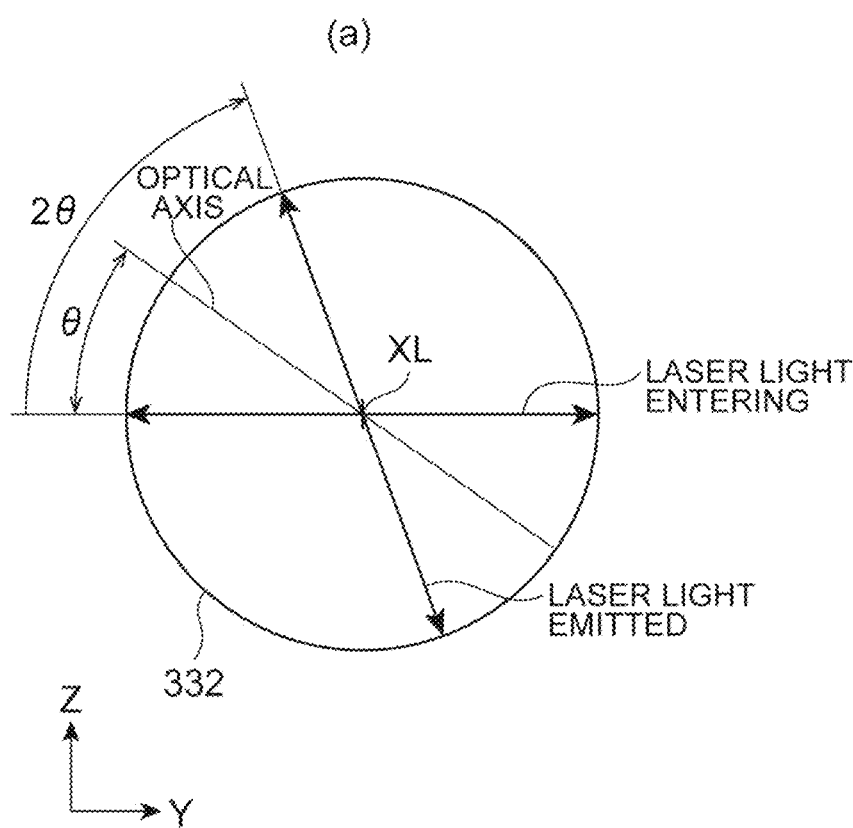
(b)
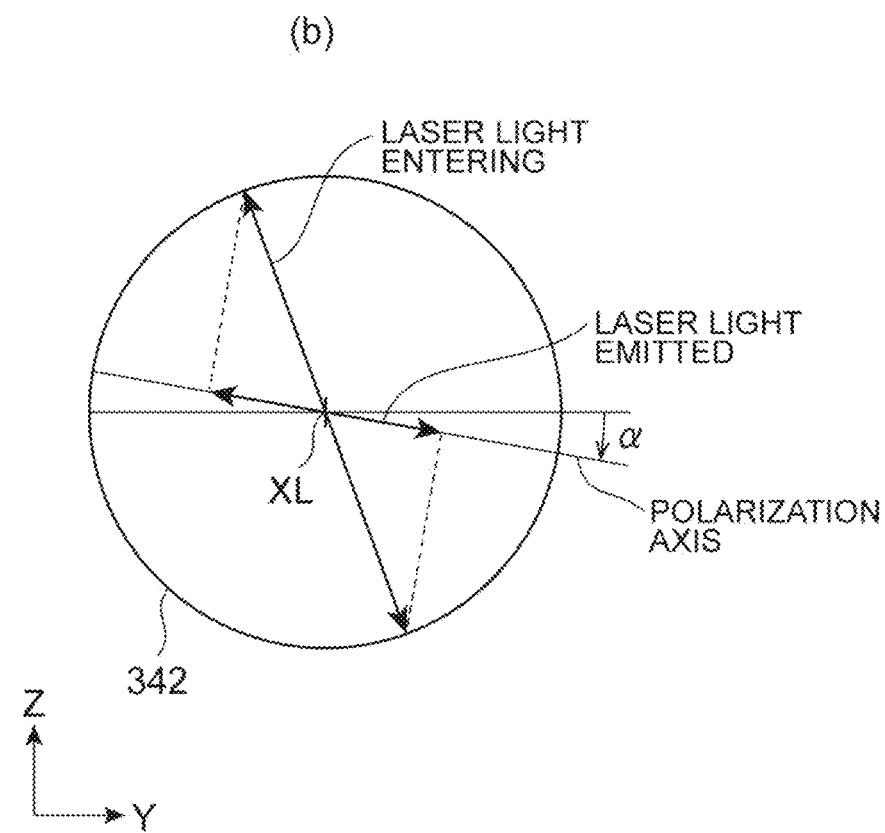

LASER MACHINING DEVICE AND LASER OUTPUT DEVICE

TECHNICAL FIELD

The present disclosure relates to a laser processing device and a laser output device.

BACKGROUND ART

Patent Literature 1 describes a laser processing device including a holding mechanism configured to hold a workpiece and a laser irradiation mechanism configured to irradiates the workpiece held by the holding mechanism with laser light. In the laser irradiation mechanism of the laser processing device, components arranged on an optical path of the laser light from a laser oscillator to a converging lens are arranged in one housing, and the housing is secured to a wall portion erected on a base of the laser processing device.

CITATION LIST

Patent Literature

Patent Literature 1: Japanese Patent No. 5456510

SUMMARY OF INVENTION

Technical Problem

In the laser processing device as described above, components on a converging optical system side configured to converge the laser light may be moved with respect to an object to be processed. On the other hand, also in such a case, it is extremely important to inhibit increase in size of the device.

An object of a first embodiment of the present disclosure is to provide a laser processing device enabled to move the components on the converging optical system side with respect to the object to be processed while inhibiting the increase in size of the device.

In the laser processing device as described above, a wavelength of the laser light suitable for processing may vary depending on specifications of the object to be processed, processing conditions, and the like.

An object of a second embodiment of the present disclosure is to provide a laser processing device enabled to use a plurality of laser light sources having respective laser light wavelengths different from each other.

In the laser processing device as described above, a reflective spatial light modulator may be provided configured to reflect the laser light while modulating the laser light. In such a case, it is extremely important that an image of the laser light on a reflective surface of the reflective spatial light modulator (image of the laser light modulated in the reflective spatial light modulator) is accurately transferred to (imaged on) an entrance pupil plane of the converging optical system.

An object of a third embodiment of the present disclosure is to provide a laser processing device enabled to easily and accurately transfer the image of the laser light on the reflective surface of the reflective spatial light modulator to the entrance pupil plane of the converging optical system.

In the laser processing device as described above, the reflective spatial light modulator may be provided configured to reflect the laser light while modulating the laser light. In such a case, it is extremely important that the image of the laser light on the reflective surface of the reflective spatial light modulator (image of the laser light modulated in the reflective spatial light modulator) is accurately transferred to (imaged on) the entrance pupil plane of the converging optical system.

An object of a fourth embodiment of the present disclosure is to provide a laser processing device enabled to accurately transfer the image of the laser light on the reflective surface of the reflective spatial light modulator to the entrance pupil plane of the converging optical system.

In the laser processing device as described above, displacement data of a laser light entrance surface of the object to be processed may be acquired by using a sensor provided on a separate axis from the converging optical system configured to converge the laser light at the object to be processed. On the other hand, also in such a case, it is extremely important to inhibit the increase in size of the device.

An object of a fifth embodiment of the present disclosure is to provide a laser processing device enabled to acquire the displacement data of the laser light entrance surface of the object to be processed while inhibiting the increase in size of the device.

In the laser processing device as described above, the wavelength of the laser light suitable for processing may vary depending on the specifications of the object to be processed, processing conditions, and the like. In such a case, if a part including a laser light source can be easily attached to and detached from the laser processing device, it is extremely effective.

An object of an embodiment of the present disclosure is to provide a laser output device enabled to be easily attached to and detached from a laser processing device.

Solution to Problem

A laser processing device according to the first embodiment of the present disclosure includes: a device frame; a support unit attached to the device frame and configured to support an object to be processed; a laser output unit attached to the device frame; and a laser converging unit attached to the device frame so as to be movable with respect to the laser output unit, in which the laser output unit includes a laser light source configured to emit laser light, and the laser converging unit includes: a reflective spatial light modulator configured to reflect the laser light while modulating the laser light; a converging optical system configured to converge the laser light at the object to be processed; and an imaging optical system constituting a double telecentric optical system in which a reflective surface of the reflective spatial light modulator and an entrance pupil plane of the converging optical system are in an imaging relationship.

In the laser processing device, the laser converging unit including the reflective spatial light modulator, the converging optical system, and the imaging optical system is movable with respect to the laser output unit including the laser light source. Therefore, for example, as compared with a case where all of the components are moved arranged on the optical path of the laser light from the laser light source to the converging optical system, the weight can be reduced of the laser converging unit to be moved, and a mechanism configured to move the laser converging unit can be downsized. Moreover, the reflective spatial light modulator, the converging optical system, and the imaging optical system are integrally moved and a mutual positional relationship is maintained, so that the image of the laser light on the reflective surface of the reflective spatial light modulator (image of the laser light modulated in the reflective spatial light modulator) can be accurately transferred to (imaged on) the entrance pupil plane of the converging optical system. Accordingly, with the laser processing device, it is possible to move the components on the converging optical system side with respect to the object to be processed while inhibiting the increase in size of the device.

In the laser processing device according to the first embodiment of the present disclosure, an emission direction of the laser light from the laser output unit may coincide with a moving direction of the laser converging unit. Thus, even if the laser converging unit moves with respect to the laser output unit, a position of the laser light entering the laser converging unit can be inhibited from changing.

In the laser processing device according to the first embodiment of the present disclosure, the laser output unit may further include a laser light collimating unit configured to collimate the laser light. Thus, even if the laser converging unit moves with respect to the laser output unit, a diameter of the laser light entering the laser converging unit can be inhibited from changing. Note that, even if the laser light is not converted to perfect parallel light by the laser light collimating unit and, for example, the laser light has some divergence angle, the laser light can be collimated in the reflective spatial light modulator.

In the laser processing device according to the first embodiment of the present disclosure, the laser converging unit may further include a housing within which an optical path of the laser light from the reflective spatial light modulator via the imaging optical system to the converging optical system is set, and the housing may be provided with a light entrance unit configured to allow the laser light emitted from the laser output unit to enter the housing. Thus, while maintaining a constant state of the optical path of the laser light from the reflective spatial light modulator via the imaging optical system to the converging optical system, the laser converging unit can be moved with respect to the laser output unit.

In the laser processing device according to the first embodiment of the present disclosure, the laser converging unit may further include a mirror arranged in the housing so as to face the light entrance unit in the moving direction of the laser converging unit, and the mirror may reflect the laser light having entered the housing from the light entrance unit, toward the reflective spatial light modulator. Thus, the laser light having entered the laser converging unit from the laser output unit is allowed to enter the reflective spatial light modulator at a desired angle.

In the laser processing device according to the first embodiment of the present disclosure, the support unit may be attached to the device frame so as to be movable along a plane perpendicular to the moving direction of the laser converging unit. Thus, in addition to locating the converging point of the laser light at a desired position with respect to the object to be processed, scanning with the laser light can be performed with respect to the object to be processed, in a direction parallel to the plane perpendicular to the moving direction of the laser converging unit.

In the laser processing device according to the first embodiment of the present disclosure, the support unit may be attached to the device frame via a first moving mechanism, and the laser converging unit may be attached to the device frame via a second moving mechanism. Thus, it is possible to reliably perform the movement of each of the support unit and the laser converging unit.

A laser processing device according to the second embodiment of the present disclosure includes: a device frame; a support unit attached to the device frame and configured to support an object to be processed; a laser output unit detachable with respect to the device frame; and a laser converging unit attached to the device frame, in which the laser output unit includes: a laser light source configured to emit laser light; and an output adjusting unit configured to adjust an output of the laser light, and the laser converging unit includes: a reflective spatial light modulator configured to reflect the laser light while modulating the laser light; a converging optical system configured to converge the laser light at the object to be processed; and an imaging optical system constituting a double telecentric optical system in which a reflective surface of the reflective spatial light modulator and an entrance pupil plane of the converging optical system are in an imaging relationship.

In the laser processing device, the laser output unit including the laser light source and the output adjusting unit is detachable with respect to the device frame, separately from the laser converging unit including the reflective spatial light modulator, the converging optical system, and the imaging optical system. Therefore, in a case where the wavelength of the laser light suitable for processing varies depending on the specifications of the object to be processed, processing conditions, and the like, it is possible to collectively replace the laser light source configured to emit laser light having a desired wavelength, and the output adjusting unit having wavelength dependence. Accordingly, with the laser processing device, it is possible to use a plurality of the laser light sources having respective laser light wavelengths different from each other.

In the laser processing device according to the second embodiment of the present disclosure, the laser output unit may further include a mounting base configured to support the laser light source and the output adjusting unit and to be detachable with respect to the device frame, and the laser output unit may be attached to the device frame via the mounting base. Thus, the laser output unit can be easily attached to and detached from the device frame.

In the laser processing device according to the second embodiment of the present disclosure, the laser output unit may further include a mirror configured to adjust an optical axis of the laser light emitted from the laser output unit. Thus, for example, when the laser output unit is attached to the device frame, it is possible to adjust a position and angle of the optical axis of the laser light entering the laser converging unit.

In the laser processing device according to the second embodiment of the present disclosure, the output adjusting unit may adjust a polarization direction of the laser light. Thus, for example, when the laser output unit is attached to the device frame, it is possible to adjust the polarization direction of the laser light entering the laser converging unit, and consequently the polarization direction of the laser light emitted from the laser converging unit.

In the laser processing device according to the second embodiment of the present disclosure, the output adjusting unit may include a $\lambda/2$ wave plate and a polarizing plate. Thus, it is possible to collectively replace the polarizing plate and the $\lambda/2$ wave plate having wavelength dependence together with the laser light source.

In the laser processing device according to the second embodiment of the present disclosure, the laser output unit may further include a laser light collimating unit configured to collimate the laser light while adjusting a diameter of the laser light. Thus, for example, even in a case where the laser converging unit moves with respect to the laser output unit, a constant state can be maintained of the laser light entering the laser converging unit.

In the laser processing device according to the second embodiment of the present disclosure, the reflective spatial light modulator, the converging optical system, and the imaging optical system may be adapted to wavelength bands of from 500 nm to 550 nm, from 1000 nm to 1150 nm, and from 1300 nm to 1400 nm. Thus, the laser output unit configured to emit the laser light in each of the wavelength bands can be attached to the laser processing device. Note that, laser light L in the wavelength band of from 500 nm to 550 nm is suitable for internal absorption type laser processing for a substrate made of sapphire, for example. The laser light L in each of the wavelength bands of from 1000 nm to 1150 nm and from 1300 nm to 1400 nm is suitable for internal absorption type laser processing for a substrate made of silicon, for example.

A laser processing device according to the third embodiment of the present disclosure includes: a support unit configured to support an object to be processed; a laser light source configured to emit laser light; a reflective spatial light modulator configured to reflect the laser light while modulating the laser light; a converging optical system configured to converge the laser light at the object to be processed; and an imaging optical system constituting a double telecentric optical system in which a reflective surface of the reflective spatial light modulator and an entrance pupil plane of the converging optical system are in an imaging relationship, in which in an optical path of the laser light from the reflective spatial light modulator to the converging optical system, at least an optical path of the laser light passing through the imaging optical system is a straight line, and a magnification M of the double telecentric optical system satisfies $0.5<M<1$ or $1<M<2$.

In the laser processing device, the magnification M of the double telecentric optical system is not 1. Thus, when the imaging optical system moves along the optical axis, a conjugate point on the converging optical system side moves. Specifically, in the case of the magnification $M<1$ (reduction system), when the imaging optical system moves toward the converging optical system along the optical axis, the conjugate point on the converging optical system side moves to an opposite side from the reflective spatial light modulator. On the other hand, in the case of the magnification $M>1$ (enlargement system), when the imaging optical system moves toward the reflective spatial light modulator along the optical axis, the conjugate point on the converging optical system side moves to the opposite side from the reflective spatial light modulator. Therefore, for example, in a case where a shift occurs in a mounting position of the converging optical system, the conjugate point on the converging optical system side can be aligned with the entrance pupil plane of the converging optical system. Moreover, at least the optical path of the laser light passing through the imaging optical system is a straight line, so that the imaging optical system can be easily moved along the optical axis. Accordingly, with the laser processing device, it is possible to easily and accurately transfer the image of the laser light on the reflective surface of the reflective spatial light modulator to the entrance pupil plane of the converging optical system. Note that, (the magnification M of the double telecentric optical system)=(the size of the image on the entrance pupil plane of the converging optical system)/(the size of the image on the reflective surface of the reflective spatial light modulator).

By setting $0.5<M<1$, an effective diameter can be increased of the laser light on the reflective surface of the reflective spatial light modulator, and the laser light can be modulated with a high-precision phase pattern. On the other hand, by setting $1<M<2$, the effective diameter can be reduced of the laser light on the reflective surface of the reflective spatial light modulator, and an angle can be reduced formed by an optical axis of the laser light entering the reflective spatial light modulator and an optical axis of the laser light emitted from the reflective spatial light modulator. It is important to suppress an incident angle and a reflection angle of the laser light with respect to the reflective spatial light modulator, for inhibiting degradation of diffraction efficiency and sufficiently exerting performance of the reflective spatial light modulator.

In the laser processing device according to the third embodiment of the present disclosure, the imaging optical system may include a first lens system on the reflective spatial light modulator side and a second lens system on the converging optical system side, and the magnification M, a first focal length f1 of the first lens system, and a second focal length f2 of the second lens system may satisfy $M=f2/f1$.

In the laser processing device according to the third embodiment of the present disclosure, the magnification M may satisfy $0.6 \leq M \leq 0.95$. Thus, it is possible to more reliably inhibit the optical path from becoming longer of the laser light from the reflective spatial light modulator to the converging optical system while maintaining the effect exerted in the case of $0.5<M<1$ described above.

In the laser processing device according to the third embodiment of the present disclosure, the magnification M may satisfy $1.05 \leq M \leq 1.7$. Thus, it is possible to more reliably inhibit the optical path from becoming longer of the laser light from the reflective spatial light modulator to the converging optical system while maintaining the effect exerted in the case of $1<M<2$ described above.

In the laser processing device according to the third embodiment of the present disclosure, the first lens system and the second lens system may be held by a holder, the holder may maintain a constant mutual positional relationship between the first lens system and the second lens system in a direction along the optical axis of the laser light, and position adjustment of the first lens system and the second lens system in the direction along the optical axis of the laser light may be performed by position adjustment of the holder. Thus, while maintaining the constant mutual positional relationship between the first lens system and the second lens system, it is possible to easily and reliably perform the position adjustment of the first lens system and the second lens system (and consequently the position adjustment of the conjugate point).

A laser processing device according to the fourth embodiment of the present disclosure includes: a support unit configured to support an object to be processed; a laser light source configured to emit laser light; a reflective spatial light modulator configured to reflect the laser light while modulating the laser light; a converging optical system configured to converge the laser light at the object to be processed; an imaging optical system constituting a double telecentric optical system in which a reflective surface of the reflective spatial light modulator and an entrance pupil plane of the converging optical system are in an imaging relationship; and a mirror configured to reflect the laser light having passed through the imaging optical system, toward the converging optical system, in which the reflective spatial light modulator reflects the laser light at an acute angle along a predetermined plane, an optical path of the laser light from the reflective spatial light modulator via the imaging optical system to the mirror is set along the plane, and an optical path of the laser light from the mirror to the converging optical system is set along a direction crossing the plane.

In the laser processing device, the optical path of the laser light from the reflective spatial light modulator via the imaging optical system to the mirror is set along the predetermined plane (plane including the optical path of the laser light entering and exiting the reflective spatial light modulator), and the optical path of the laser light from the mirror to the converging optical system is set along the direction crossing the plane. Thus, for example, the reflective spatial light modulator can be made to reflect the laser light as P-polarized light and the mirror can be made to reflect the laser light as S-polarized light. This is important for accurately transferring the image of the laser light on the reflective surface of the reflective spatial light modulator to the entrance pupil plane of the converging optical system. Further, the reflective spatial light modulator reflects the laser light at an acute angle. It is important to suppress the incident angle and the reflection angle of the laser light with respect to the reflective spatial light modulator, for inhibiting degradation of diffraction efficiency and sufficiently exerting performance of the reflective spatial light modulator. As described above, with the laser processing device, the image of the laser light on the reflective surface of the reflective spatial light modulator can be accurately transferred to the entrance pupil plane of the converging optical system.

In the laser processing device according to the fourth embodiment of the present disclosure, the optical path of the laser light from the mirror to the converging optical system may be set along a direction orthogonal to the plane, and the mirror may reflect the laser light at a right angle. Thus, the optical path of the laser light from the reflective spatial light modulator to the converging optical system can be routed at a right angle.

In the laser processing device according to the fourth embodiment of the present disclosure, the mirror may be a dichroic mirror. Thus, part of the laser light transmitted through the dichroic mirror can be used for various purposes.

In the laser processing device according to the fourth embodiment of the present disclosure, the reflective spatial light modulator may reflect the laser light as the P-polarized light, and the mirror may reflect the laser light as the S-polarized light. Thus, the image of the laser light on the reflective surface of the reflective spatial light modulator can be accurately transferred to the entrance pupil plane of the converging optical system.

The laser processing device according to the fourth embodiment of the present disclosure may further include a polarization direction adjusting unit arranged on an optical path of the laser light from the laser light source to the reflective spatial light modulator and configured to adjust a polarization direction of the laser light. Thus, it is possible to adjust the polarization direction of the laser light in preparation for the fact that the reflective spatial light modulator reflects the laser light at an acute angle, so that the optical path of the laser light from the laser light source to the reflective spatial light modulator can be routed at a right angle.

A laser processing device according to the fifth embodiment of the present disclosure includes: a support unit configured to support an object to be processed; a laser light source configured to emit laser light; a reflective spatial light modulator configured to reflect the laser light while modulating the laser light; a converging optical system configured to converge the laser light at the object to be processed; an imaging optical system constituting a double telecentric optical system in which a reflective surface of the reflective spatial light modulator and an entrance pupil plane of the converging optical system are in an imaging relationship; a mirror configured to reflect the laser light having passed through the imaging optical system, toward the converging optical system; and a first sensor configured to acquire displacement data of a laser light entrance surface of the object to be processed, in which an optical path of the laser light from the mirror to the converging optical system is set along a first direction, an optical path of the laser light from the reflective spatial light modulator via the imaging optical system to the mirror is set along a second direction perpendicular to the first direction, and the first sensor is arranged on one side of the converging optical system in a third direction perpendicular to the first direction and the second direction.

In the laser processing device, scanning with the laser light is performed with respect to the object to be processed such that the first sensor is relatively advanced with respect to the converging optical system, whereby the displacement data of the laser light entrance surface at an arbitrary position of the object to be processed can be acquired before the laser light is emitted to the position. Thus, for example, scanning with the laser light can be performed with respect to the object to be processed such that a constant distance is maintained between the laser light entrance surface of the object to be processed and the converging point of the laser light. Further, the first sensor is arranged on one side with respect to a plane on which the optical path of the laser light from the reflective spatial light modulator to the converging optical system is arranged. That is, the first sensor is efficiently arranged with respect to the components arranged on the optical path of the laser light from the reflective spatial light modulator to the converging optical system. Accordingly, with the laser processing device, it is possible to acquire the displacement data of the laser light entrance surface of the object to be processed while inhibiting the increase in size of the device.

In the laser processing device according to the fifth embodiment of the present disclosure, the mirror may be a dichroic mirror. Thus, part of the laser light transmitted through the dichroic mirror can be used for various purposes.

In the laser processing device according to the fifth embodiment of the present disclosure, the mirror may reflect the laser light as S-polarized light. Thus, scanning with the laser light is performed with respect to the object to be processed along the third direction, whereby the scanning direction of the laser light and the polarization direction of the laser light can be made to coincide with each other.

The laser processing device according to the fifth embodiment of the present disclosure may further include: a housing configured to support at least the reflective spatial light modulator, the converging optical system, the imaging optical system, the mirror, and the first sensor, and a moving mechanism configured to move the housing along the first direction, in which the converging optical system and the first sensor are attached to one end side of the housing in the second direction, and the moving mechanism is attached to one side surface of the housing in the third direction. Thus, it is possible to integrally move the reflective spatial light modulator, the converging optical system, the imaging optical system, the mirror, and the first sensor while inhibiting the increase in size of the device.

The laser processing device according to the fifth embodiment of the present disclosure may further include a drive mechanism configured to move the converging optical system along the first direction, in which the converging optical system is attached to the one end side of the housing in the second direction via the drive mechanism. Thus, for example, the converging optical system can be moved such that a constant distance is maintained between the laser light entrance surface of the object to be processed and the converging point of the laser light.

In the laser processing device according to the fifth embodiment of the present disclosure, the reflective spatial light modulator may be attached to another end side of the housing in the second direction. Thus, the components can be efficiently arranged with respect to the housing.

The laser processing device according to the fifth embodiment of the present disclosure may further include a second sensor configured to acquire displacement data of the laser light entrance surface of the object to be processed, in which the second sensor is arranged on another side of the converging optical system in the third direction. Thus, when scanning with the laser light is performed with respect to the object to be processed such that the first sensor is relatively advanced with respect to the converging optical system, the first sensor can be used to acquire the displacement data of the laser light entrance surface. On the other hand, when scanning with the laser light is performed with respect to the object to be processed such that the second sensor is relatively advanced with respect to the converging optical system, the second sensor can be used to acquire the displacement data of the laser light entrance surface. Further, the first sensor is arranged on one side with respect to the plane on which the optical path of the laser light from the reflective spatial light modulator to the converging optical system is arranged, and the second sensor is arranged on the other side with respect to the plane on which the optical path of the laser light from the reflective spatial light modulator to the converging optical system is arranged. Thus, the first sensor and the second sensor can be efficiently arranged with respect to the components arranged on the optical path of the laser light from the reflective spatial light modulator to the converging optical system.

A laser output device according to an embodiment of the present disclosure includes: a laser light source configured to emit laser light; an output adjusting unit configured to adjust an output of the laser light emitted from the laser light source; a mirror unit configured to externally emit the laser light having passed through the output adjusting unit; and a mounting base including a main surface on which the laser light source, the output adjusting unit, and the mirror unit are arranged, in which an optical path of the laser light from the laser light source via the output adjusting unit to the mirror unit is set along a plane parallel to the main surface, and the mirror unit includes a mirror configured to adjust an optical axis of the laser light, and externally emits the laser light along a direction crossing the plane.

In the laser output device, the laser light source, the output adjusting unit, and the mirror unit are arranged on the main surface of the mounting base. Thus, for example, the mounting base is attached to and detached from the device frame of the laser processing device, whereby the laser output device can be easily attached to and detached from the laser processing device. Further, the optical path of the laser light from the laser light source via the output adjusting unit to the mirror unit is set along a plane parallel to the main surface of the mounting base, and the mirror unit externally emits the laser light along the direction crossing the plane. Thus, for example, in a case where the emission direction of the laser light is along the vertical direction, the height of the laser output device is reduced, so that the laser output device can be easily attached to and detached from the laser processing device. Further, the mirror unit includes the mirror configured to adjust the optical axis of the laser light. Thus, for example, when the laser output device is attached to the device frame of the laser processing device, it is possible to adjust the position and angle of the optical axis of the laser light entering the laser converging unit (a component including at least a converging optical system configured to converge the laser light at the object to be processed). As described above, the laser output device can be easily attached to and detached from the laser processing device.

In the laser output device according to the embodiment of the present disclosure, the mirror unit may externally emit the laser light along a direction orthogonal to the plane. Thus, adjustment can be facilitated of the optical axis of the laser light in the mirror unit.

In the laser output device according to the embodiment of the present disclosure, the output adjusting unit may adjust a polarization direction of the laser light emitted from the laser light source. Thus, for example, when the laser output device is attached to the device frame of the laser processing device, it is possible to adjust the polarization direction of the laser light entering the laser converging unit provided on the laser processing device side, and consequently the polarization direction of the laser light emitted from the laser converging unit.

In the laser output device according to the embodiment of the present disclosure, the output adjusting unit may include: a $\lambda/2$ wave plate into which the laser light emitted from the laser light source enters along a first axis parallel to the plane; a first holder configured to hold the $\lambda/2$ wave plate such that the $\lambda/2$ wave plate is rotatable about the first axis as a center, a polarizing member into which the laser light having passed through the $\lambda/2$ wave plate enters along a second axis parallel to the plane; and a second holder configured to hold the polarizing member such that the polarizing member is rotatable about the second axis as a center. Thus, it is possible to adjust the output and polarization direction of the laser light emitted from the laser light source with a simple configuration. Further, the laser output device includes such an output adjusting unit, whereby it is possible to use the $\lambda/2$ wave plate and the polarizing member corresponding to the wavelength of the laser light emitted from the laser light source.

The laser output device according to the embodiment of the present disclosure may further include an optical path correcting member held by the second holder so as to be rotatable integrally with the polarizing member about the second axis as the center, and configured to return the optical axis of the laser light to the second axis, the laser light having deviated from the second axis due to being transmitted through the polarizing member. Thus, it is possible to correct a shift of the optical path of the laser light due to being transmitted through the polarizing member.

In the laser output device according to the embodiment of the present disclosure, the first axis and the second axis may coincide with each other. Thus, simplification and downsizing of the device can be achieved.

In the laser output device according to the embodiment of the present disclosure, the mirror unit may include a support base, and a first mirror and a second mirror each being the mirror, the support base may be attached to the mounting base so as to be position adjustable, the first mirror may be attached to the support base so as to be angle adjustable, and reflect the laser light having passed through the output adjusting unit along a direction parallel to the plane, and the second mirror may be attached to the support base so as to be angle adjustable, and reflect the laser light reflected by the first mirror along the direction crossing the plane. Thus, for example, when the laser output device is attached to the device frame of the laser processing device, it is possible to accurately adjust the position and angle of the optical axis of the laser light entering the laser converging unit provided on the laser processing device side. Moreover, position adjustment is performed of the support base with respect to the mounting base, whereby position adjustment can be performed of the first mirror and the second mirror integrally and easily.

The laser output device according to the embodiment of the present disclosure may further include a laser light collimating unit arranged on an optical path of the laser light from the output adjusting unit to the mirror unit and configured to collimate the laser light while adjusting a diameter of the laser light. Thus, for example, even in a case where the laser converging unit provided on the laser processing device side moves with respect to the laser output device, a constant state can be maintained of the laser light entering the laser converging unit.

The laser output device according to the embodiment of the present disclosure may further include a shutter arranged on an optical path of the laser light from the laser light source to the output adjusting unit and configured to open and close the optical path of the laser light, in which the laser light source has a function of switching ON/OFF of the output of the laser light. Thus, switching ON/OFF of the output of the laser light from the laser output device can be performed by switching ON/OFF of the output of the laser light in the laser light source. In addition, with the shutter, it is possible to prevent the laser light from being unexpectedly emitted from the laser output device, for example.

Advantageous Effects of Invention

According to the first embodiment of the present disclosure, the laser processing device can be provided enabled to move the components on the converging optical system side with respect to the object to be processed while inhibiting the increase in size of the device.

According to the second embodiment of the present disclosure, the laser processing device enabled to use a plurality of the laser light sources having respective laser light wavelengths different from each other.

According to the third embodiment of the present disclosure, the laser processing device can be provided enabled to easily and accurately transfer the image of the laser light on the reflective surface of the reflective spatial light modulator to the entrance pupil plane of the converging optical system.

According to the fourth embodiment of the present disclosure, the laser processing device can be provided enabled to accurately transfer the image of the laser light on the reflective surface of the reflective spatial light modulator to the entrance pupil plane of the converging optical system.

According to the fifth embodiment of the present disclosure, the laser processing device can be provided enabled to acquire the displacement data of the laser light entrance surface of the object to be processed while inhibiting the increase in size of the device.

According to the embodiment of the present disclosure, the laser output device can be provided enabled to be easily attached to and detached from the laser processing device.

BRIEF DESCRIPTION OF DRAWINGS

FIG. 15($a$) is a diagram illustrating a polarization direction in the $\lambda/2$ wave plate unit of the laser output unit of FIG. 9, and FIG. 15($b$) is a diagram illustrating a polarization direction in the polarizing plate unit of the laser output unit of FIG. 9.

DESCRIPTION OF EMBODIMENTS

Figure 1:
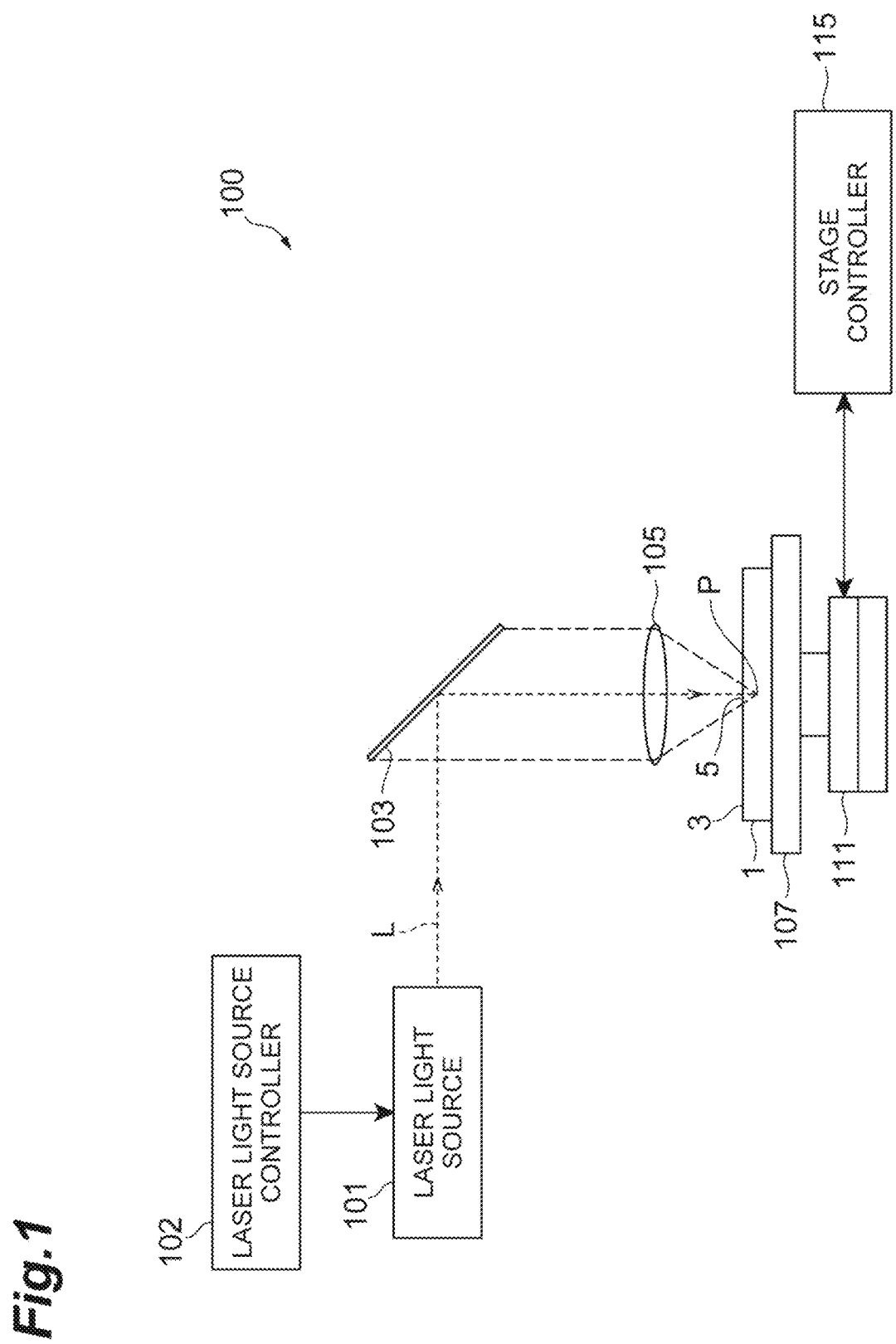
FIG. 1 is a schematic configuration diagram of a laser processing device used for forming a modified region.

In the following, embodiments of the present disclosure will be described in detail with reference to the drawings. In the drawings, the same or equivalent parts will be denoted by the same reference signs, without redundant description.

In a laser processing device according to the embodiments (described later), laser light is converged at an object to be processed to form a modified region within the object to be processed along a line to cut. Therefore, formation of the modified region will be described at first with reference to FIGS. 1 to 6.

As illustrated in FIG. 1, a laser processing device 100 includes a laser light source 101 configured to cause laser light L to oscillate in a pulsating manner, a dichroic mirror 103 arranged so as to change a direction of the optical axis (optical path) of the laser light L by 90°, and a converging lens 105 configured to converge the laser light L. The laser processing device 100 further includes a support table 107 configured to support an object to be processed 1 irradiated with the laser light L converged by the converging lens 105, a stage 111 configured to move the support table 107, a laser light source controller 102 configured to regulate the laser light source 101 for adjusting the output, pulse width, pulse waveform, and the like of the laser light L, and a stage controller 115 configured to regulate the movement of the stage 111.

In the laser processing device 100, the laser light L emitted from the laser light source 101 changes the direction of its optical axis by 90° with the dichroic mirror 103 and then is converged by the converging lens 105 within the object to be processed 1 mounted on the support table 107. At the same time, the stage 111 is moved, so that the object to be processed 1 moves with respect to the laser light L along a line to cut 5. Thus, a modified region along the line to cut 5 is formed in the object to be processed 1. While the stage 111 is moved here for relatively moving the laser light L, the converging lens 105 may be moved instead or together therewith.

Figure 2:
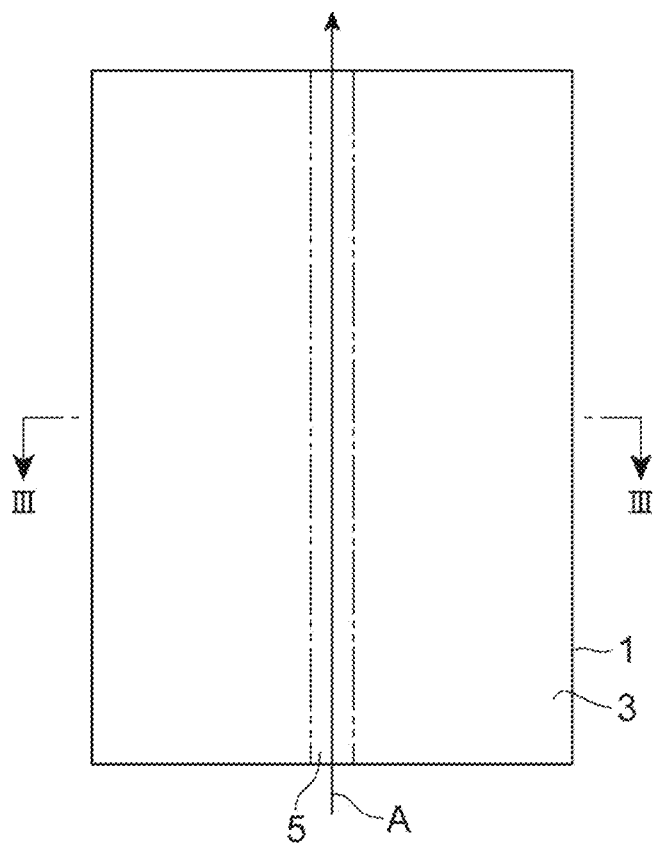
FIG. 2 is a plan view of an object to be processed for which the modified region is formed.
Figure 3:
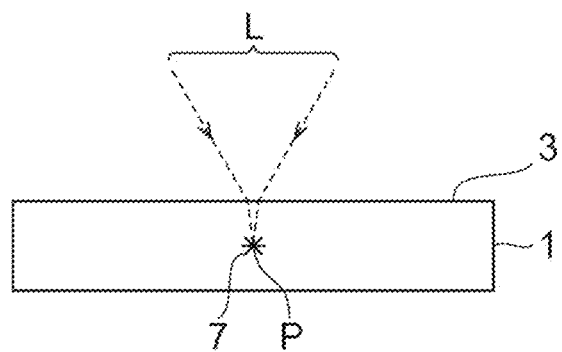
FIG. 3 is a sectional view of the object to be processed taken along the line III-III of FIG. 2.
Figure 4:
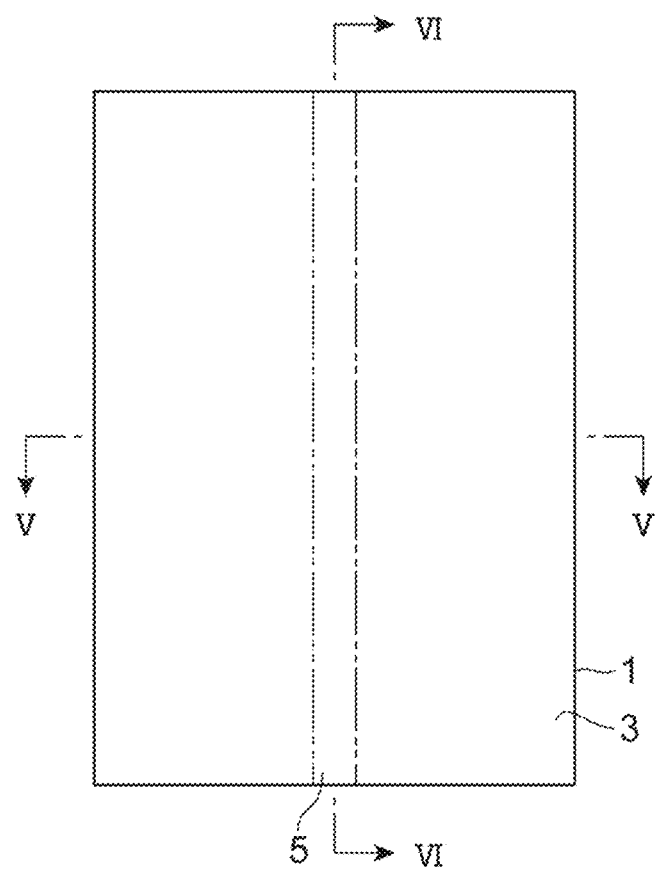
FIG. 4 is a plan view of the object to be processed after laser processing.
Figure 5:
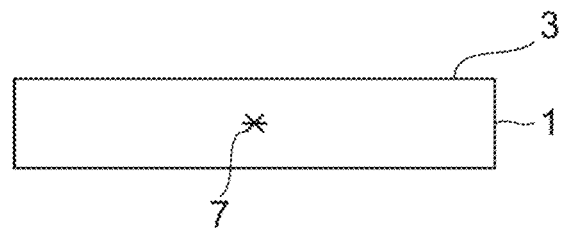
FIG. 5 is a sectional view of the object to be processed taken along the line V-V of FIG. 4.
Figure 6:
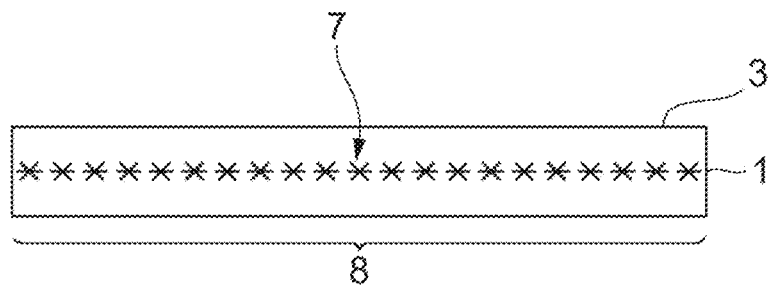
FIG. 6 is a sectional view of the object to be processed taken along the line VI-VI of FIG. 4.

Employed as the object to be processed 1 is a planar member (for example, a substrate or a wafer), examples of which include semiconductor substrates formed of semiconductor materials and piezoelectric substrates formed of piezoelectric materials. As illustrated in FIG. 2, in the object to be processed 1, the line to cut 5 is set for cutting the object to be processed 1. The line to cut 5 is a virtual line extending straight. In a case where a modified region is formed within the object to be processed 1, the laser light L is relatively moved along the line to cut 5 (that is, in the direction of arrow A in FIG. 2) while a converging point (converging position) P is set within the object to be processed 1 as illustrated in FIG. 3. Thus, a modified region 7 is formed within the object to be processed 1 along the line to cut 5 as illustrated in FIGS. 4, 5 and 6, and the modified region 7 formed along the line to cut 5 becomes a cutting start region 8.

The converging point P is a position at which the laser light L is converged. The line to cut 5 may be curved instead of being straight, a three-dimensional one combining them, or one specified by coordinates. The line to cut 5 may be one actually drawn on a front surface 3 of the object to be processed 1 without being restricted to the virtual line. The modified region 7 may be formed either continuously or intermittently. The modified region 7 may be formed in either rows or dots, and only need to be formed at least within the object to be processed 1. A crack may be formed from the modified region 7 as a start point, and the crack and the modified region 7 may be exposed at an outer surface (the front surface 3, a back surface, or an outer peripheral surface) of the object to be processed 1. A laser light entrance surface in forming the modified region 7 is not limited to the front surface 3 of the object to be processed 1 but may be the back surface of the object to be processed 1.

Incidentally, in a case where the modified region 7 is formed within the object to be processed 1, the laser light L is transmitted through the object to be processed 1 and is particularly absorbed near the converging point P located within the object to be processed 1. Thus, the modified region 7 is formed in the object to be processed 1 (that is, internal absorption type laser processing). In this case, the front surface 3 of the object to be processed 1 hardly absorbs the laser light L and thus does not melt. On the other hand, in a case where the modified region 7 is formed on the front surface 3 of the object to be processed 1, the laser light L is particularly absorbed near the converging point P located on the front surface 3, and removal portions such as holes and grooves are formed (surface absorption type laser processing) by being melted from the front surface 3 and removed.

The modified region 7 is a region in which density, refractive index, mechanical strength and other physical characteristics are different from the surroundings. Examples of the modified region 7 include a molten processed region (meaning at least one of a region resolidified after having been once molten, a region in the molten state, and a region in the process of resolidifying from the molten state), a crack region, a dielectric breakdown region, a refractive index changed region, and a mixed region thereof. Other examples of the modified region 7 include a region where the density of the modified region 7 has changed compared to the density of an unmodified region in a material of the object to be processed 1, and a region formed with a lattice defect. In a case where the material of the object to be processed 1 is single crystal silicon, the modified region 7 can also be said to be a high dislocation density region.

The molten processed region, refractive index changed region, region where the density of the modified region 7 has changed compared to the density of the unmodified region, and region formed with the lattice defect may further incorporate the crack (cracking or microcrack) therewithin or at an interface between the modified region 7 and the unmodified region. The incorporated crack may be formed over the whole surface of the modified region 7 or in only a portion or a plurality of portions thereof. The object to be processed 1 includes a substrate made of a crystalline material having a crystal structure. For example, the object to be processed 1 includes a substrate formed of at least one of gallium nitride (GaN), silicon (Si), silicon carbide (SiC), $LiTaO_3$, and sapphire ($Al_2O_3$). In other words, the object to be processed 1 includes, for example, a gallium nitride substrate, a silicon substrate, a SiC substrate, a $LiTaO_3$ substrate, or a sapphire substrate. The crystalline material may be either an anisotropic crystal or an isotropic crystal. Further, the object to be processed 1 may include a substrate made of a non-crystalline material having a non-crystalline structure (amorphous structure), and may include a glass substrate, for example.

In the embodiments, the modified region 7 can be formed by forming a plurality of modified spots (processing marks) along the line to cut 5. In this case, the plurality of modified spots gathers to be the modified region 7. Each of the modified spots is a modified portion formed by a shot of one pulse of pulsed laser light (that is, laser irradiation of one pulse: laser shot). Examples of the modified spots include crack spots, molten processed spots, refractive index changed spots, and those in which at least one of them is mixed. As for the modified spots, their sizes and lengths of the crack occurring therefrom can be controlled as necessary in view of the required cutting accuracy, the required flatness of cut surfaces, the thickness, kind, and crystal orientation of the object to be processed 1, and the like. In addition, in the embodiments, the modified spots can be formed as the modified region 7, along the line to cut 5.

[Laser Processing Device According to Embodiments]

Next, the laser processing device according to the embodiments will be described. In the following description, the directions orthogonal to each other in the horizontal plane are defined as the X-axis direction and the Y-axis direction, and the vertical direction is defined as the Z-axis direction.

[Overall Configuration of Laser Processing Device]

Figure 7:
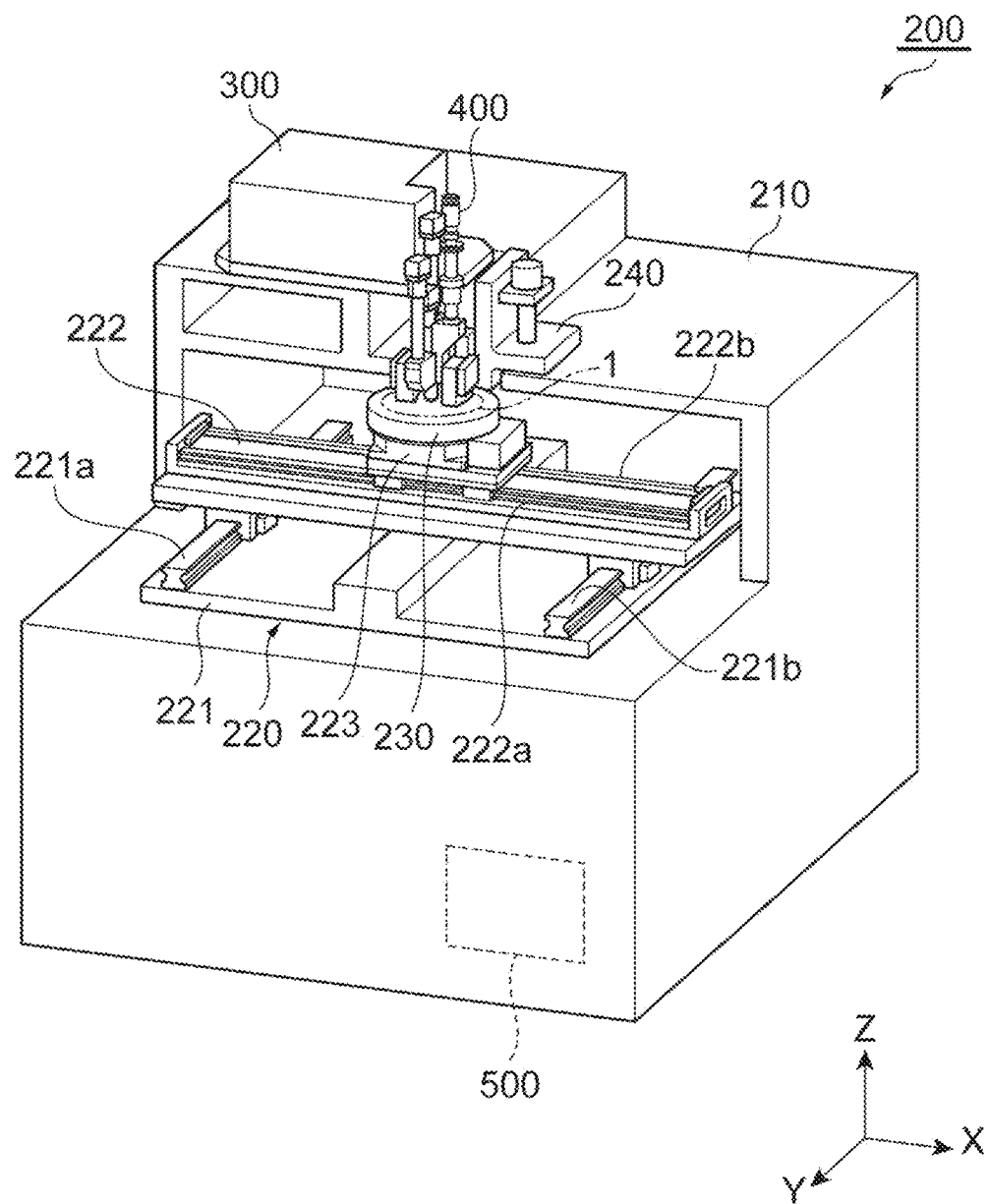
FIG. 7 is a perspective view of a laser processing device according to an embodiment.

As illustrated in FIG. 7, a laser processing device 200 includes a device frame 210, a first moving mechanism 220, a support table (support unit) 230, and a second moving mechanism 240. Further, the laser processing device 200 includes a laser output unit (laser output device) 300, a laser converging unit 400, and a controller 500.

The first moving mechanism 220 is attached to the device frame 210. The first moving mechanism 220 includes a first rail unit 221, a second rail unit 222, and a movable base 223. The first rail unit 221 is attached to the device frame 210. The first rail unit 221 is provided with a pair of rails 221a and 221b extending along the Y-axis direction. The second rail unit 222 is attached to the pair of rails 221a and 221b of the first rail unit 221 so as to be movable along the Y-axis direction. The second rail unit 222 is provided with a pair of rails 222a and 222b extending along the X-axis direction. The movable base 223 is attached to the pair of rails 222a and 222b of the second rail unit 222 so as to be movable along the X-axis direction. The movable base 223 is rotatable about an axis parallel to the Z-axis direction as the center.

Figure 8:
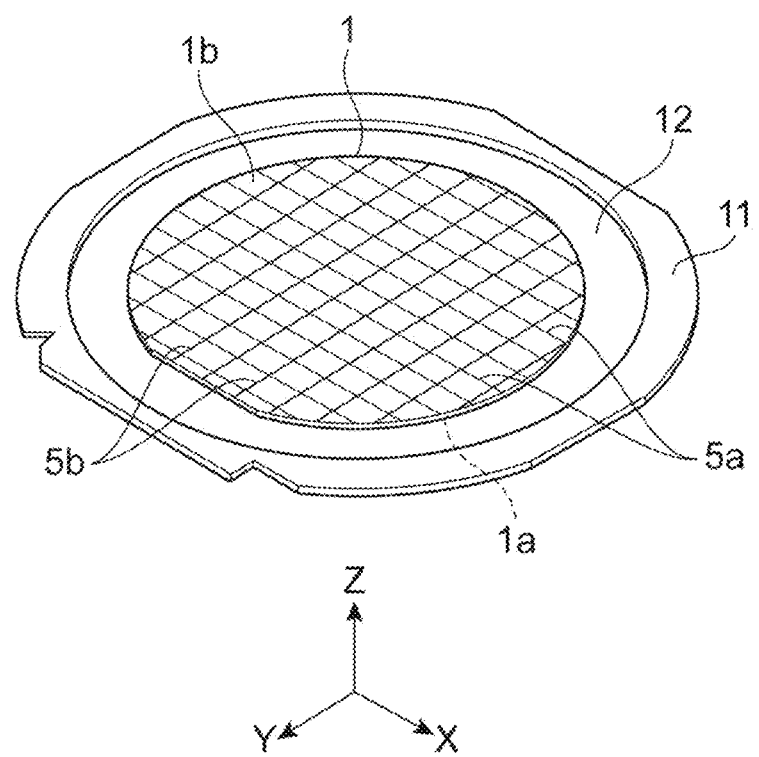
FIG. 8 is a perspective view of an object to be processed attached to a support table of the laser processing device of FIG. 7.

The support table 230 is attached to the movable base 223. The support table 230 supports the object to be processed 1. The object to be processed 1 includes a plurality of functional devices (a light receiving device such as a photodiode, a light emitting device such as a laser diode, a circuit device formed as a circuit, or the like) formed in a matrix shape on the front surface side of a substrate made of a semiconductor material such as silicon. When the object to be processed 1 is supported on the support table 230, as illustrated in FIG. 8, on a film 12 stretched over an annular frame 11, for example, a front surface 1a of the object to be processed 1 (a surface of the plurality of functional devices side) is pasted. The support table 230 holds the frame 11 with a clamp and suctions the film 12 with a vacuum chuck table, to support the object to be processed 1. On the support table 230, a plurality of lines to cut 5a parallel to each other and a plurality of lines to cut 5b parallel to each other are set in a grid pattern so as to pass between adjacent functional devices on the object to be processed 1.

As illustrated in FIG. 7, the support table 230 is moved along the Y-axis direction by operation of the second rail unit 222 in the first moving mechanism 220. In addition, the support table 230 is moved along the X-axis direction by operation of the movable base 223 in the first moving mechanism 220. Further, the support table 230 is rotated about the axis parallel to the Z-axis direction as the center by operation of the movable base 223 in the first moving mechanism 220. As described above, the support table 230 is attached to the device frame 210 to be movable along the X-axis direction and the Y-axis direction, and to be rotatable about the axis parallel to the Z-axis direction as the center.

The laser output unit 300 is attached to the device frame 210. The laser converging unit 400 is attached to the device frame 210 via the second moving mechanism 240. The laser converging unit 400 is moved along the Z-axis direction by operation of the second moving mechanism 240. As described above, the laser converging unit 400 is attached to the device frame 210 so as to be movable along the Z-axis direction with respect to the laser output unit 300.

The controller 500 includes a Central Processing Unit (CPU), Read Only Memory (ROM), Random Access Memory (RAM), and the like. The controller 500 controls operation of each unit of the laser processing device 200.

As an example, in the laser processing device 200, a modified region is formed within the object to be processed 1 along each of the lines to cut 5a and 5b (see FIG. 8) as follows.

First, the object to be processed 1 is supported on the support table 230 such that a back surface 1b (see FIG. 8) of the object to be processed 1 becomes the laser light entrance surface, and each line to cut 5a of the object to be processed 1 is aligned in a direction parallel to the X-axis direction. Subsequently, the laser converging unit 400 is moved by the second moving mechanism 240 such that the converging point of the laser light L is located at a position apart from the laser light entrance surface of the object to be processed 1 by a predetermined distance within the object to be processed 1. Subsequently, while a constant distance is maintained between the laser light entrance surface of the object to be processed 1 and the converging point of the laser light L, the converging point of the laser light L is relatively moved along each line to cut 5a. Thus, the modified region is formed within the object to be processed 1 along each line to cut 5a.

When the formation of the modified region along each line to cut 5a is completed, the support table 230 is rotated by the first moving mechanism 220, and each line to cut 5b of the object to be processed 1 is aligned in the direction parallel to the X-axis direction. Subsequently, the laser converging unit 400 is moved by the second moving mechanism 240 such that the converging point of the laser light L is located at a position apart from the laser light entrance surface of the object to be processed 1 by a predetermined distance within the object to be processed 1. Subsequently, while a constant distance is maintained between the laser light entrance surface of the object to be processed 1 and the converging point of the laser light L, the converging point of the laser light L is relatively moved along each line to cut 5b. Thus, the modified region is formed within the object to be processed 1 along each line to cut 5b.

As described above, in the laser processing device 200, the direction parallel to the X-axis direction is a processing direction (scanning direction of the laser light L). Note that, the relative movement of the converging point of the laser light L along each line to cut 5a and the relative movement of the converging point of the laser light L along each line to cut 5b are performed by the movement of the support table 230 along the X-axis direction by the first moving mechanism 220. In addition, the relative movement of the converging point of the laser light L between the lines to cut 5a and the relative movement of the converging point of the laser light L between the lines to cut 5b are performed by the movement of the support table 230 along the Y-axis direction by the first moving mechanism 220.

Figure 9:
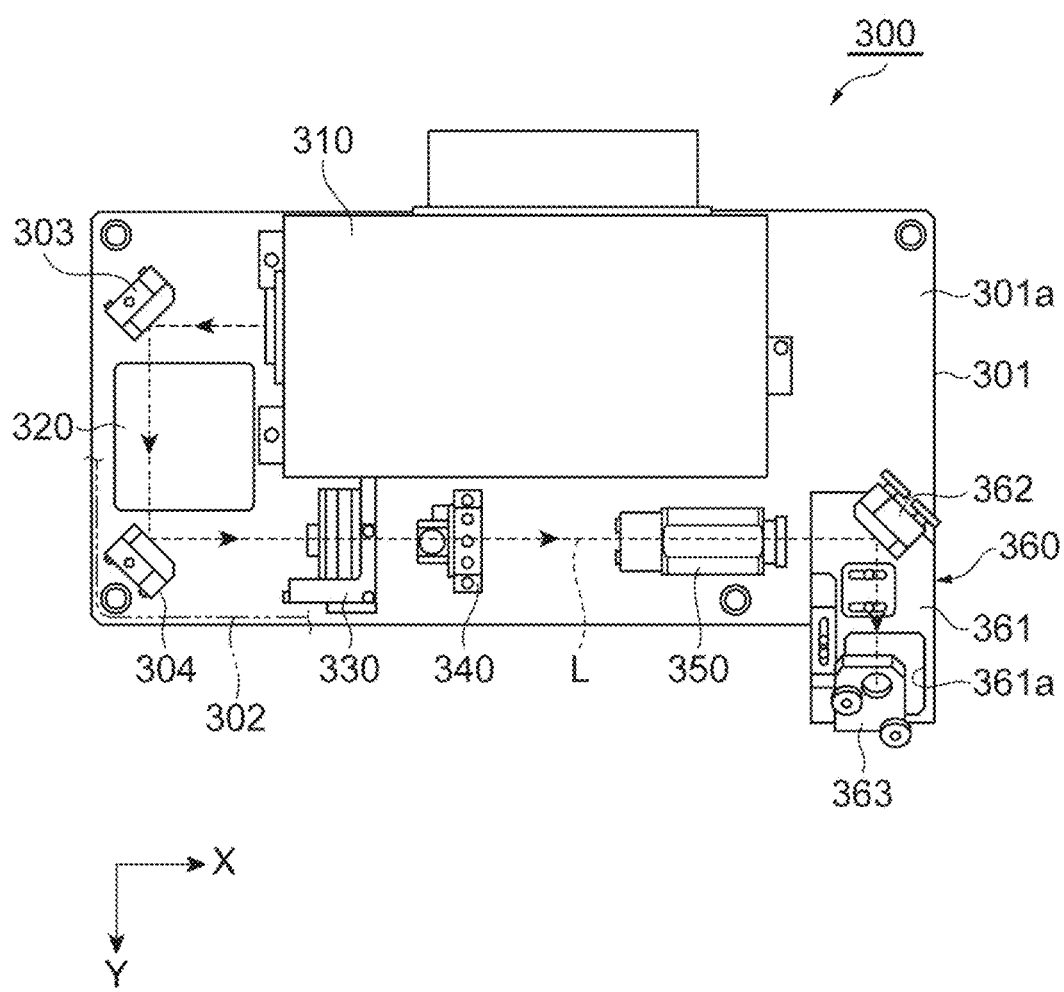
FIG. 9 is a sectional view of a laser output unit taken along the ZX plane of FIG. 7.

As illustrated in FIG. 9, the laser output unit 300 includes a mounting base 301, a cover 302, and a plurality of mirrors 303 and 304. Further, the laser output unit 300 includes a laser oscillator (laser light source) 310, a shutter 320, a λ/2 wave plate unit (output adjusting unit, polarization direction adjusting unit) 330, a polarizing plate unit (output adjusting unit, polarization direction adjusting unit) 340, a beam expander (laser light collimating unit) 350, and a mirror unit 360.

The mounting base 301 supports the plurality of mirrors 303 and 304, the laser oscillator 310, the shutter 320, the λ/2 wave plate unit 330, the polarizing plate unit 340, the beam expander 350, and the mirror unit 360. The plurality of mirrors 303 and 304, the laser oscillator 310, the shutter 320, the λ/2 wave plate unit 330, the polarizing plate unit 340, the beam expander 350, and the mirror unit 360 are attached to a main surface 301a of the mounting base 301. The mounting base 301 is a planar member and is detachable with respect to the device frame 210 (see FIG. 7). The laser output unit 300 is attached to the device frame 210 via the mounting base 301. That is, the laser output unit 300 is detachable with respect to the device frame 210.

The cover 302 covers the plurality of mirrors 303 and 304, the laser oscillator 310, the shutter 320, the λ/2 wave plate unit 330, the polarizing plate unit 340, the beam expander 350, and the mirror unit 360 on the main surface 301a of the mounting base 301. The cover 302 is detachable with respect to the mounting base 301.

The laser oscillator 310 oscillates linearly polarized laser light L in a pulsating manner along the X-axis direction. The wavelength of the laser light L emitted from the laser oscillator 310 is included in any of the wavelength bands of from 500 nm to 550 nm, from 1000 nm to 1150 nm, or from 1300 nm to 1400 nm. The laser light L in the wavelength band of from 500 nm to 550 nm is suitable for internal absorption type laser processing on a substrate made of sapphire, for example. The laser light L in each of the wavelength bands of from 1000 nm to 1150 nm and from 1300 nm to 1400 nm is suitable for internal absorption type laser processing for a substrate made of silicon, for example. The polarization direction of the laser light L emitted from the laser oscillator 310 is, for example, a direction parallel to the Y-axis direction. The laser light L emitted from the laser oscillator 310 is reflected by the mirror 303 and enters the shutter 320 along the Y-axis direction.

In the laser oscillator 310, ON/OFF of the output of the laser light L is switched as follows. In a case where the laser oscillator 310 includes a solid state laser, ON/OFF of a Q switch (acousto-optic modulator (AOM), electro-optic modulator (EOM), or the like) provided in a resonator is switched, whereby ON/OFF of the output of the laser light L is switched at high speed. In a case where the laser oscillator 310 includes a fiber laser, ON/OFF of the output of a semiconductor laser constituting a seed laser and an amplifier (excitation) laser is switched, whereby ON/OFF of the output of the laser light L is switched at high speed. In a case where the laser oscillator 310 uses an external modulation device, ON/OFF of the external modulation device (AOM, EOM, or the like) provided outside the resonator is switched, whereby ON/OFF of the output of the laser light L is switched at high speed.

The shutter 320 opens and closes the optical path of the laser light L by a mechanical mechanism. Switching ON/OFF of the output of the laser light L from the laser output unit 300 is performed by switching ON/OFF of the output of the laser light L in the laser oscillator 310 as described above, and the shutter 320 is provided, whereby the laser light L is prevented from being unexpectedly emitted from the laser output unit 300, for example. The laser light L having passed through the shutter 320 is reflected by the mirror 304 and sequentially enters the λ/2 wave plate unit 330 and the polarizing plate unit 340 along the X-axis direction.

The λ/2 wave plate unit 330 and the polarizing plate unit 340 function as the output adjusting unit configured to adjust the output (light intensity) of the laser light L. In addition, the λ/2 wave plate unit 330 and the polarizing plate unit 340 function as the polarization direction adjusting unit configured to adjust the polarization direction of the laser light L. Details of these will be described later. The laser light L having sequentially passed through the λ/2 wave plate unit 330 and the polarizing plate unit 340 enters the beam expander 350 along the X-axis direction.

The beam expander 350 collimates the laser light L while adjusting the diameter of the laser light L. The laser light L having passed through the beam expander 350 enters the mirror unit 360 along the X-axis direction.

The mirror unit 360 includes a support base 361 and a plurality of mirrors 362 and 363. The support base 361 supports the plurality of mirrors 362 and 363. The support base 361 is attached to the mounting base 301 so as to be position adjustable along the X-axis direction and the Y-axis direction. The mirror (first mirror) 362 reflects the laser light L having passed through the beam expander 350 in the Y-axis direction. The mirror 362 is attached to the support base 361 such that its reflective surface is angle adjustable around an axis parallel to the Z-axis, for example. The mirror (second mirror) 363 reflects the laser light L reflected by the mirror 362 in the Z-axis direction. The mirror 363 is attached to the support base 361 such that its reflective surface is angle adjustable around an axis parallel to the X-axis, for example, and is position adjustable along the Y-axis direction. The laser light L reflected by the mirror 363 passes through an opening 361a formed in the support base 361 and enters the laser converging unit 400 (see FIG. 7) along the Z-axis direction. That is, an emission direction of the laser light L by the laser output unit 300 coincides with a moving direction of the laser converging unit 400. As described above, each of the mirrors 362 and 363 has a mechanism configured to adjust the angle of the reflective surface. In the mirror unit 360, the position adjustment of the support base 361 with respect to the mounting base 301, the position adjustment of the mirror 363 with respect to the support base 361, and the angle adjustment of the reflective surface of each of the mirrors 362 and 363 are performed, whereby the position and angle of the optical axis of the laser light L emitted from the laser output unit 300 are aligned with respect to the laser converging unit 400. That is, each of the plurality of mirrors 362 and 363 is a component configured to adjust the optical axis of the laser light L emitted from the laser output unit 300.

Figure 10:
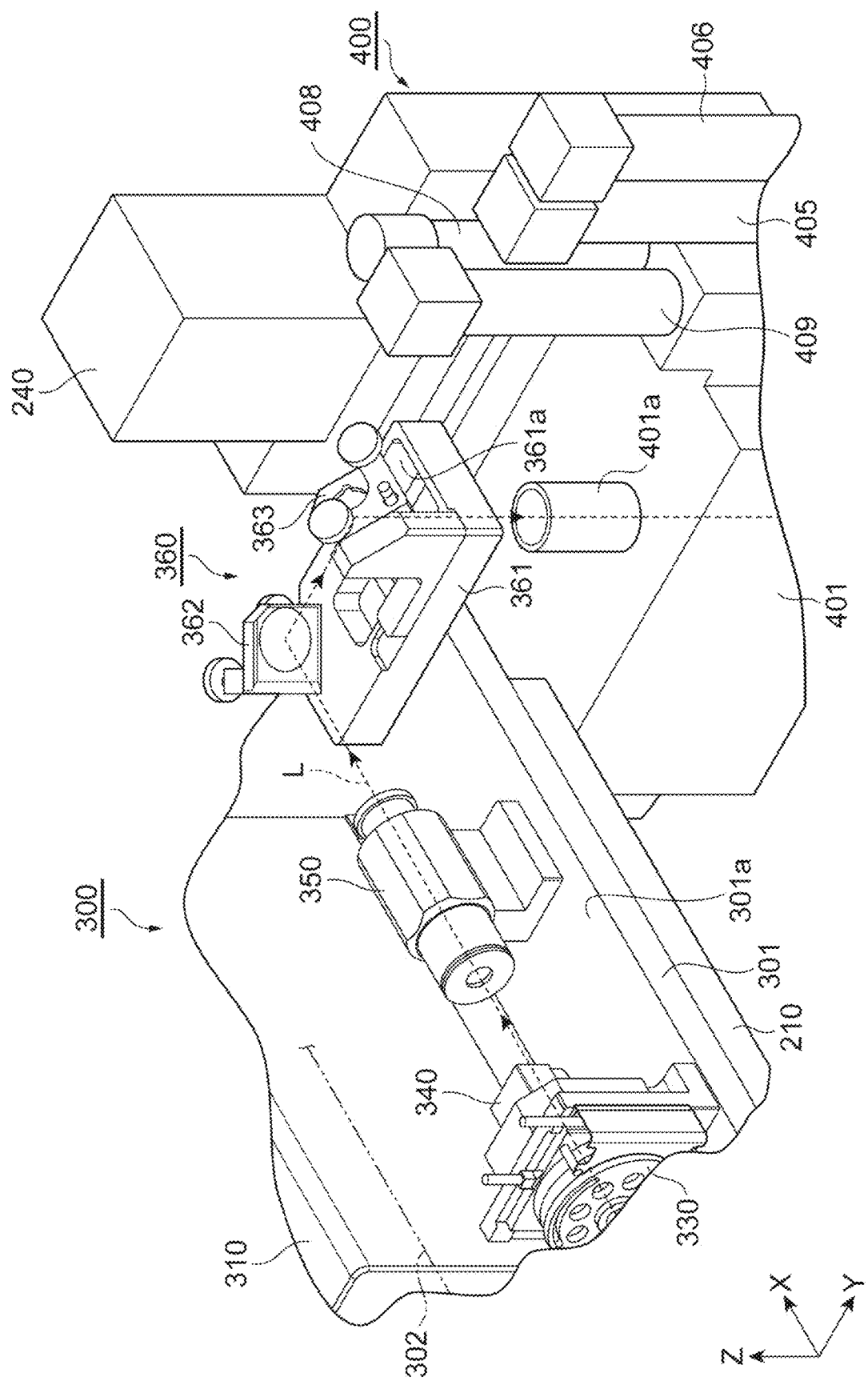
FIG. 10 is a perspective view of a part of the laser output unit and a laser converging unit in the laser processing device of FIG. 7.

As illustrated in FIG. 10, the laser converging unit 400 includes a housing 401. The housing 401 has a rectangular parallelepiped shape with the Y-axis direction as the longitudinal direction. The second moving mechanism 240 is attached to one side surface 401e of the housing 401 (see FIGS. 11 and 13). A cylindrical light entrance unit 401a is provided in the housing 401 so as to face the opening 361a of the mirror unit 360 in the Z-axis direction. The light entrance unit 401a allows the laser light L emitted from the laser output unit 300 to enter the housing 401. The mirror unit 360 and the light entrance unit 401a are separated from each other by a distance in which mutual contact does not occur when the laser converging unit 400 is moved along the Z-axis direction by the second moving mechanism 240.

Figure 11:
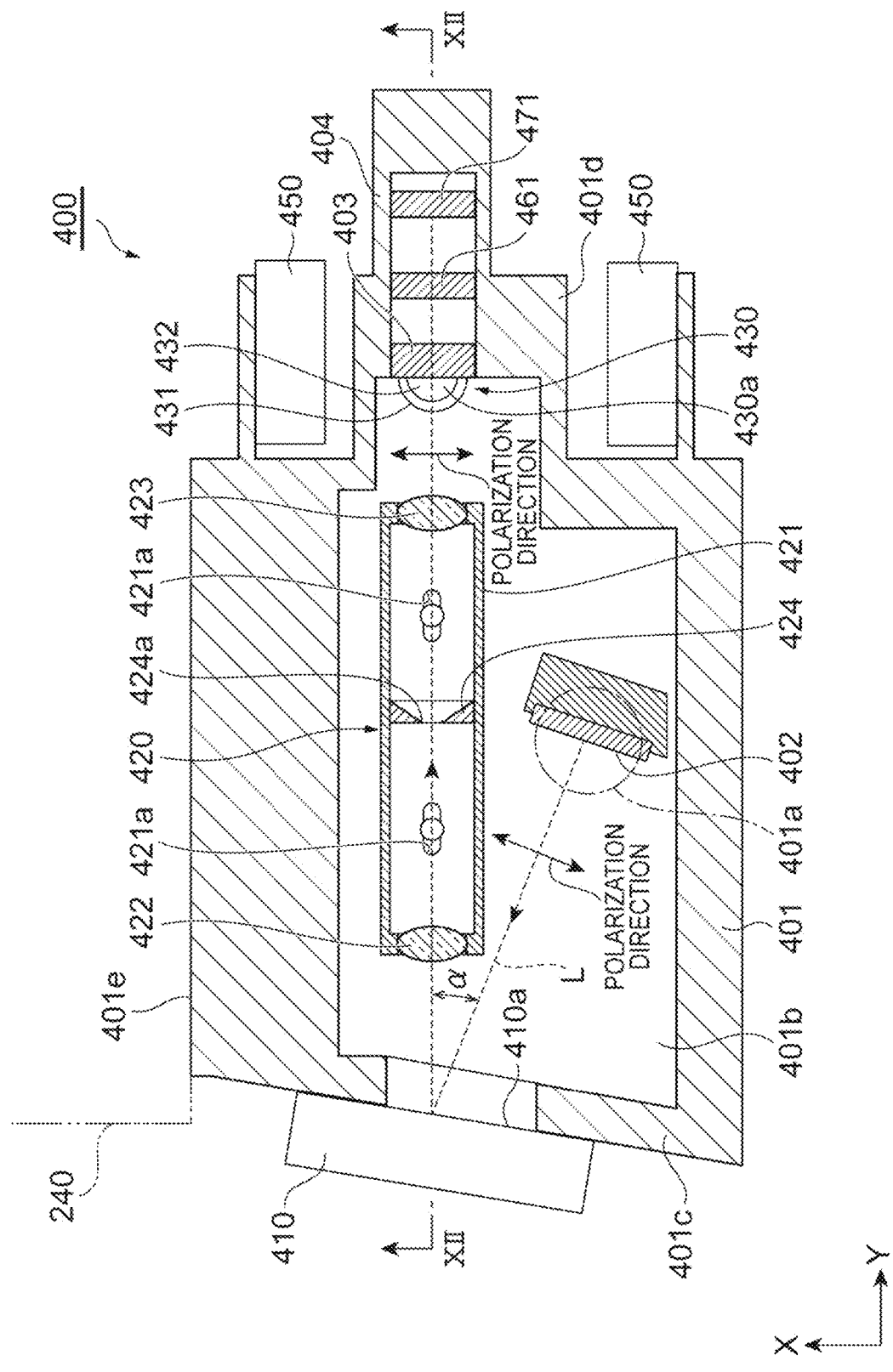
FIG. 11 is a sectional view of the laser converging unit taken along the XY plane of FIG. 7.
Figure 12:
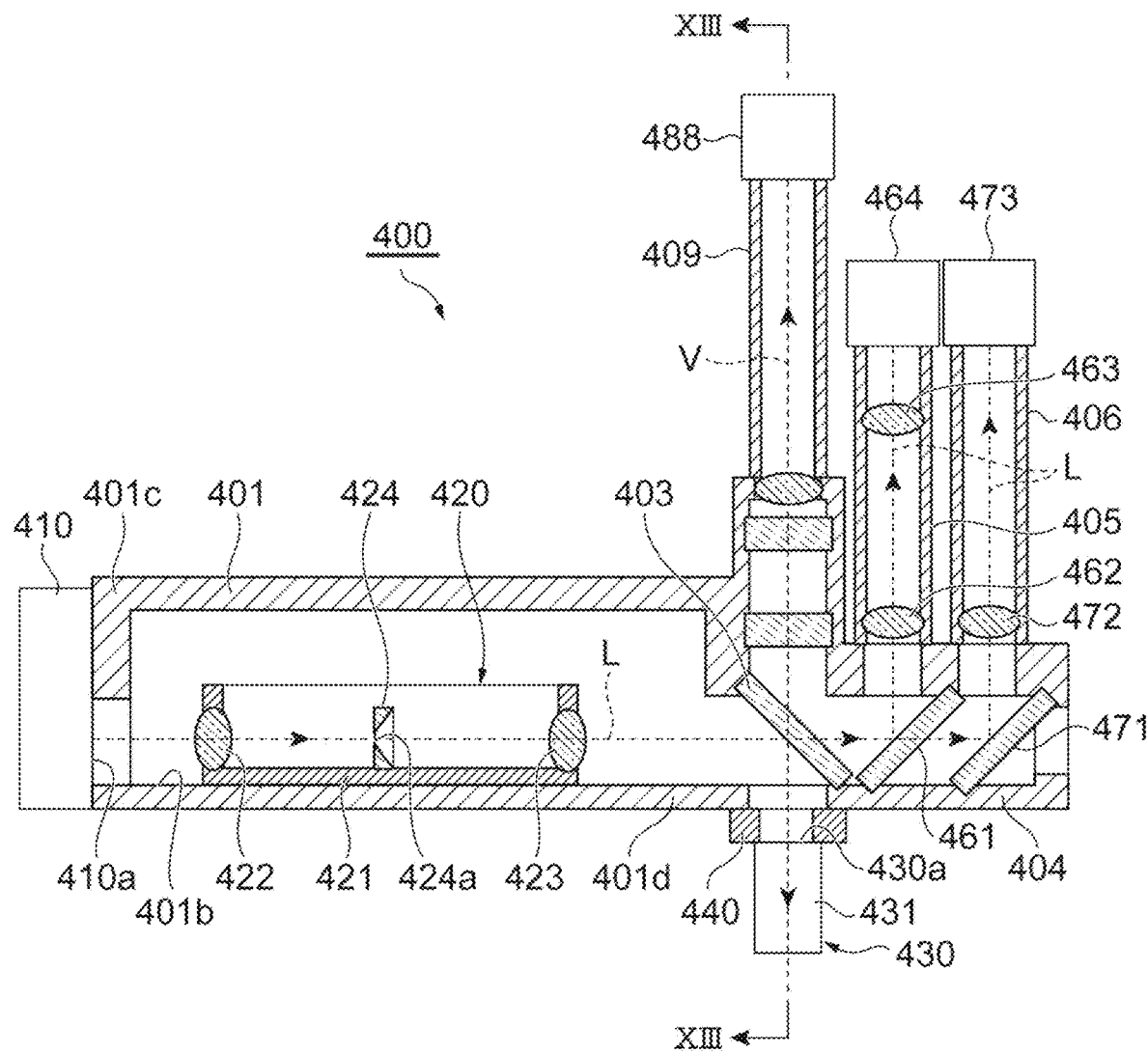
FIG. 12 is a sectional view of the laser converging unit taken along the line XII-XII of FIG. 11.

As illustrated in FIGS. 11 and 12, the laser converging unit 400 includes a mirror 402 and a dichroic mirror 403. Further, the laser converging unit 400 includes a reflective spatial light modulator 410, a 4f lens unit 420, a converging lens unit (converging optical system) 430, a drive mechanism 440, and a pair of distance measuring sensors (a first sensor and a second sensor) 450.

The mirror 402 is attached to a bottom surface 401b of the housing 401 so as to face the light entrance unit 401a in the Z-axis direction. The mirror 402 reflects the laser light L having entered the housing 401 via the light entrance unit 401a in a direction parallel to the XY plane. The laser light L collimated by the beam expander 350 of the laser output unit 300 enters the mirror 402 along the Z-axis direction. That is, the laser light L as parallel light enters the mirror 402 along the Z-axis direction. For that reason, even if the laser converging unit 400 is moved along the Z-axis direction by the second moving mechanism 240, a constant state is maintained of the laser light L entering the mirror 402 along the Z-axis direction. The laser light L reflected by the mirror 402 enters the reflective spatial light modulator 410.

The reflective spatial light modulator 410 is attached to an end 401c of the housing 401 in the Y-axis direction in a state where the reflective surface 410a faces the inside of the housing 401. The reflective spatial light modulator 410 is, for example, a reflective liquid crystal (Liquid Crystal on Silicon (LCOS)) Spatial Light Modulator (SLM), and reflects the laser light L in the Y-axis direction while modulating the laser light L. The laser light L modulated and reflected by the reflective spatial light modulator 410 enters the 4f lens unit 420 along the Y-axis direction. Here, in a plane parallel to the XY plane, an angle α formed by an optical axis of the laser light L entering the reflective spatial light modulator 410 and an optical axis of the laser light L emitted from the reflective spatial light modulator 410, is an acute angle (for example, from 10° to 60°). That is, the laser light L is reflected at an acute angle along the XY plane in the reflective spatial light modulator 410. This is for suppressing an incident angle and a reflection angle of the laser light L to inhibit the degradation of diffraction efficiency, and for sufficiently exerting performance of the reflective spatial light modulator 410. Note that, in the reflective spatial light modulator 410, for example, the thickness of a light modulation layer in which a liquid crystal is used is extremely thin as several micrometers to several tens of micrometers, so that the reflective surface 410a can be regarded as substantially the same as a light entering and exiting surface of the light modulation layer.

The 4f lens unit 420 includes a holder 421, a lens (first lens system, imaging optical system) 422 on the reflective spatial light modulator 410 side, a lens (second lens system, imaging optical system) 423 on the converging lens unit 430 side, and a slit member 424. The holder 421 holds the pair of the lenses 422 and 423 and the slit member 424. The holder 421 maintains a constant mutual positional relationship between the pair of lenses 422 and 423 and the slit member 424 in a direction along the optical axis of the laser light L. The pair of lenses 422 and 423 constitutes a double telecentric optical system in which the reflective surface 410a of the reflective spatial light modulator 410 and an entrance pupil plane 430a of the converging lens unit 430 are in an imaging relationship. Thus, an image of the laser light L on the reflective surface 410a of the reflective spatial light modulator 410 (an image of the laser light L modulated in the reflective spatial light modulator 410) is transferred to (imaged on) the entrance pupil plane 430a of the converging lens unit 430. A slit 424a is formed in the slit member 424. The slit 424a is located between the lens 422 and the lens 423 and near a focal plane of the lens 422. Unnecessary part of the laser light L modulated and reflected by the reflective spatial light modulator 410 is blocked by the slit member 424. The laser light L having passed through the 4f lens unit 420 enters the dichroic mirror 403 along the Y-axis direction.

The dichroic mirror 403 reflects most (for example, from 95% to 99.5%) of the laser light L in the Z-axis direction and transmits part (for example, from 0.5% to 5%) of the laser light L along the Y-axis direction. Most of the laser light L is reflected at a right angle along the ZX plane in the dichroic mirror 403. The laser light L reflected by the dichroic mirror 403 enters the converging lens unit 430 along the Z-axis direction.

The converging lens unit 430 is attached to an end 401d (an end on the opposite side from the end 401c) of the housing 401 in the Y-axis direction via the drive mechanism 440. The converging lens unit 430 includes a holder 431 and a plurality of lenses 432. The holder 431 holds the plurality of lenses 432. The plurality of lenses 432 converges the laser light L at the object to be processed 1 (see FIG. 7) supported by the support table 230. The drive mechanism 440 moves the converging lens unit 430 along the Z-axis direction by driving force of a piezoelectric device.

The pair of distance measuring sensors 450 is attached to the end 401d of the housing 401 so as to be respectively located on both sides of the converging lens unit 430 in the X-axis direction. Each of the distance measuring sensors 450 emits light for distance measurement (for example, laser light) to the laser light entrance surface of the object to be processed 1 (see FIG. 7) supported by the support table 230, and detects the light for distance measurement reflected by the laser light entrance surface, thereby acquiring displacement data of the laser light entrance surface of the object to be processed 1. Note that, for the distance measuring sensors 450, sensors can be used of a triangulation method, a laser confocal method, a white confocal method, a spectral interference method, an astigmatism method, and the like.

In the laser processing device 200, as described above, the direction parallel to the X-axis direction is the processing direction (scanning direction of the laser light L). For that reason, when the converging point of the laser light L is relatively moved along each of the lines to cut 5a and 5b, out of the pair of distance measuring sensors 450, one of the distance measuring sensors 450 being relatively advanced with respect to the converging lens unit 430 acquires the displacement data of the laser light entrance surface of the object to be processed 1 along each of the lines to cut 5a and 5b. Then, the drive mechanism 440 moves the converging lens unit 430 along the Z-axis direction on the basis of the displacement data acquired by the distance measuring sensors 450 such that a constant distance is maintained between the laser light entrance surface of the object to be processed 1 and the converging point of the laser light L.

The laser converging unit 400 includes a beam splitter 461, a pair of lenses 462 and 463, and a camera 464 for monitoring intensity distribution of the laser light L. The beam splitter 461 divides the laser light L transmitted through the dichroic mirror 403 into a reflection component and a transmission component. The laser light L reflected by the beam splitter 461 sequentially enters the pair of lenses 462 and 463, and the camera 464 along the Z-axis direction. The pair of lenses 462 and 463 constitutes a double telecentric optical system in which the entrance pupil plane 430a of the converging lens unit 430 and an imaging surface of the camera 464 are in an imaging relationship. Thus, an image of the laser light L on the entrance pupil plane 430a of the converging lens unit 430 is transferred to (imaged on) the imaging surface of the camera 464. As described above, the image of the laser light L on the entrance pupil plane 430a of the converging lens unit 430 is the image of the laser light L modulated in the reflective spatial light modulator 410. Therefore, in the laser processing device 200, an imaging result by the camera 464 is monitored, whereby an operation state of the reflective spatial light modulator 410 can be grasped.

Further, the laser converging unit 400 includes a beam splitter 471, a lens 472, and a camera 473 for monitoring an optical axis position of the laser light L. The beam splitter 471 divides the laser light L transmitted through the beam splitter 461 into a reflection component and a transmission component. The laser light L reflected by the beam splitter 471 sequentially enters the lens 472 and the camera 473 along the Z-axis direction. The lens 472 converges the laser light L having entered, on an imaging surface of the camera 473. In the laser processing device 200, while an imaging result by each of the cameras 464 and 473 is monitored, in the mirror unit 360, the position adjustment of the support base 361 with respect to the mounting base 301, the position adjustment of the mirror 363 with respect to the support base 361, and the angle adjustment of the reflective surface of each of the mirrors 362 and 363 are performed (see FIGS. 9 and 10), whereby a shift can be corrected of the optical axis of the laser light L entering the converging lens unit 430 (a positional shift of intensity distribution of the laser light with respect to the converging lens unit 430, and an angular shift of the optical axis of the laser light L with respect to the converging lens unit 430).

The plurality of beam splitters 461 and 471 is arranged in a cylindrical body 404 extending along the Y-axis direction from the end 401d of the housing 401. The pair of lenses 462 and 463 is arranged in a cylindrical body 405 erected on the cylindrical body 404 along the Z-axis direction, and the camera 464 is arranged at an end of the cylindrical body 405. The lens 472 is arranged in a cylindrical body 406 erected on the cylindrical body 404 along the Z-axis direction, and the camera 473 is arranged at an end of the cylindrical body 406. The cylindrical body 405 and the cylindrical body 406 are arranged side by side in the Y-axis direction. Note that, the laser light L transmitted through the beam splitter 471 may be absorbed by a damper or the like provided at an end of the cylindrical body 404, or may be used for an appropriate purpose.

Figure 13:
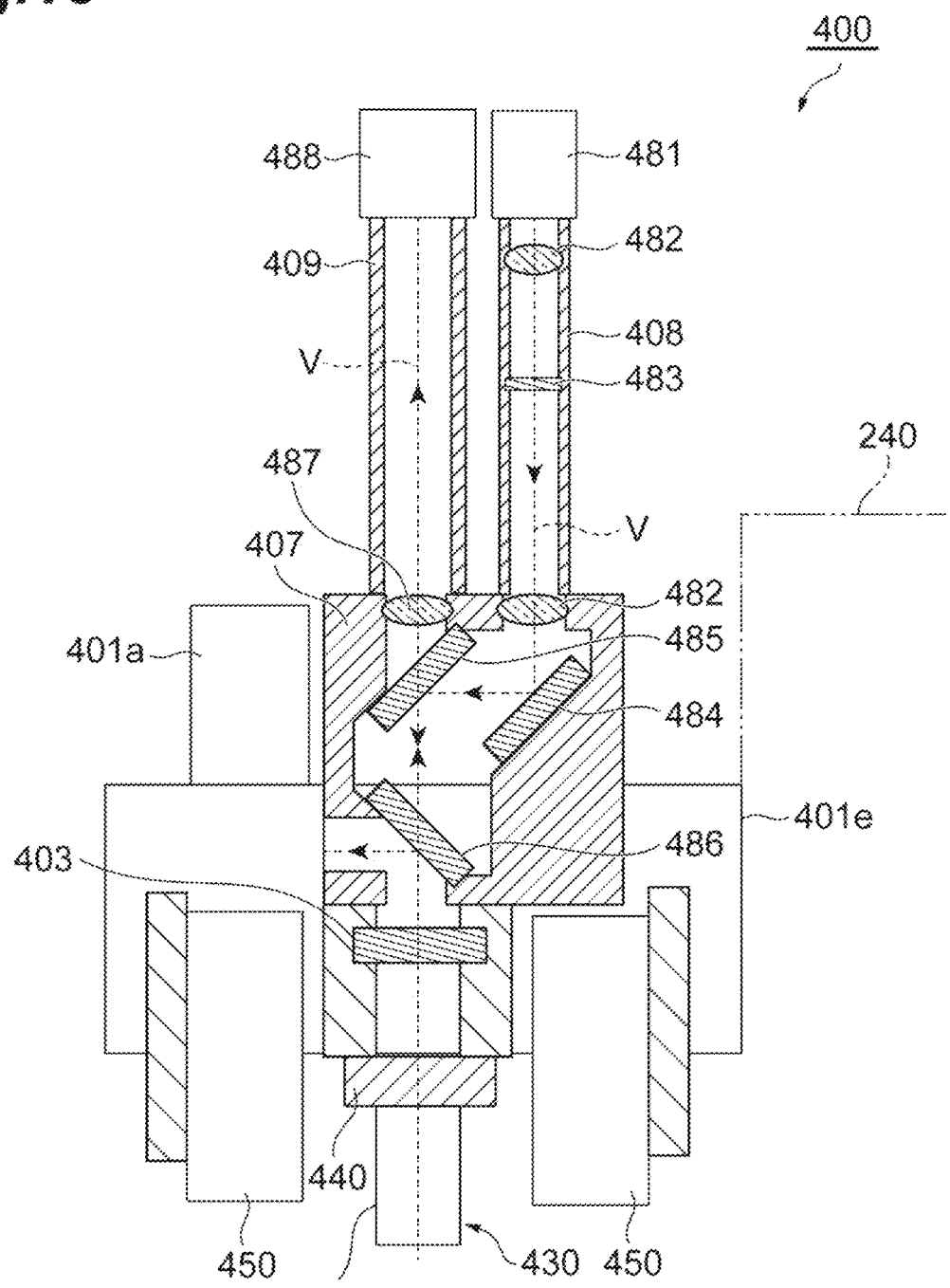
FIG. 13 is a sectional view of the laser converging unit taken along the line XIII-XIII of FIG. 12.

As illustrated in FIGS. 12 and 13, the laser converging unit 400 includes a visible light source 481, a plurality of lenses 482, a reticle 483, a mirror 484, a semitransparent mirror 485, a beam splitter 486, a lens 487, and an observation camera 488. The visible light source 481 emits visible light V along the Z-axis direction. The plurality of lenses 482 collimates the visible light V emitted from the visible light source 481. The reticle 483 gives a scale line to the visible light V. The mirror 484 reflects the visible light V collimated by the plurality of lenses 482 in the X-axis direction. The semitransparent mirror 485 divides the visible light V reflected by the mirror 484 into a reflection component and a transmission component. The visible light V reflected by the semitransparent mirror 485 is sequentially transmitted through the beam splitter 486 and the dichroic mirror 403 along the Z-axis direction, and is emitted via the converging lens unit 430 to the object to be processed 1 supported by the support table 230 (See FIG. 7).

The visible light V emitted to the object to be processed 1 is reflected by the laser light entrance surface of the object to be processed 1, enters the dichroic mirror 403 via the converging lens unit 430, and is transmitted through the dichroic mirror 403 along the Z-axis direction. The beam splitter 486 divides the visible light V transmitted through the dichroic mirror 403 into a reflection component and a transmission component. The visible light V transmitted through the beam splitter 486 is transmitted through the semitransparent mirror 485 and sequentially enters the lens 487 and the observation camera 488 along the Z-axis direction. The lens 487 converges the visible light V having entered, on an imaging surface of the observation camera 488. In the laser processing device 200, an imaging result by the observation camera 488 is observed, whereby a state of the object to be processed 1 can be grasped.

The mirror 484, the semitransparent mirror 485, and the beam splitter 486 are arranged in a holder 407 attached on the end 401d of the housing 401. The plurality of lenses 482 and the reticle 483 are arranged in a cylindrical body 408 erected on the holder 407 along the Z-axis direction, and the visible light source 481 is arranged at an end of the cylindrical body 408. The lens 487 is arranged in a cylindrical body 409 erected on the holder 407 along the Z-axis direction, and the observation camera 488 is arranged at an end of the cylindrical body 409. The cylindrical body 408 and the cylindrical body 409 are arranged side by side in the X-axis direction. Note that, each of the visible light V transmitted through the semitransparent mirror 485 along the X-axis direction and the visible light V reflected in the X-axis direction by the beam splitter 486 may be absorbed by a damper or the like provided on a wall portion of the holder 407, or may be used for an appropriate purpose.

In the laser processing device 200, replacement of the laser output unit 300 is assumed. This is because the wavelength of the laser light L suitable for processing varies depending on the specifications of the object to be processed 1, processing conditions, and the like. For that reason, a plurality of the laser output units 300 is prepared having respective wavelengths of emitting laser light L different from each other. Here, prepared are the laser output unit 300 in which the wavelength of the emitting laser light L is included in the wavelength band of from 500 nm to 550 nm, the laser output unit 300 in which the wavelength of the emitting laser light L is included in the wavelength band of from 1000 nm to 1150 nm, and the laser output unit 300 in which the wavelength of the emitting laser light L is included in the wavelength band of from 1300 nm to 1400 nm.

On the other hand, in the laser processing device 200, replacement of the laser converging unit 400 is not assumed. This is because the laser converging unit 400 is adapted to multiple wavelengths (adapted to a plurality of wavelength bands not continuous with each other). Specifically, the mirror 402, the reflective spatial light modulator 410, the pair of lenses 422 and 423 of the 4f lens unit 420, the dichroic mirror 403, the lens 432 of the converging lens unit 430, and the like are adapted to the multiple wavelengths. Here, the laser converging unit 400 is adapted to the wavelength bands of from 500 nm to 550 nm, from 1000 nm to 1150 nm, and from 1300 nm to 1400 nm. This is implemented by designing the components of the laser converging unit 400 so as to satisfy desired optical performance, such as coating the components of the laser converging unit 400 with a predetermined dielectric multilayer film. Note that, in the laser output unit 300, the $\lambda/2$ wave plate unit 330 includes a $\lambda/2$ wave plate, and the polarizing plate unit 340 includes a polarizing plate. The $\lambda/2$ wave plate and the polarizing plate are optical devices having high wavelength dependence. For that reason, the $\lambda/2$ wave plate unit 330 and the polarizing plate unit 340 are provided in the laser output unit 300 as different components for each wavelength band.

[Optical Path and Polarization Direction of Laser Light in Laser Processing Device]

In the laser processing device 200, as illustrated in FIG. 11, the polarization direction of the laser light L converged at the object to be processed 1 supported by the support table 230 is a direction parallel to the X-axis direction, and coincides with the processing direction (scanning direction of the laser light L). Here, in the reflective spatial light modulator 410, the laser light L is reflected as P-polarized light. This is because in a case where a liquid crystal is used for the light modulation layer of the reflective spatial light modulator 410, when the liquid crystal is oriented such that the liquid crystal molecules are inclined in a surface parallel to the plane including the optical axis of the laser light L entering and exiting the reflective spatial light modulator 410, phase modulation is applied to the laser light L in a state where the rotation of the plane of polarization is inhibited (for example, see Japanese Patent No. 3878758). On the other hand, in the dichroic mirror 403, the laser light L is reflected as S-polarized light. This is because, for example, when the laser light L is reflected as the S-polarized light rather than when the laser light L is reflected as the P-polarized light, the number of coatings is reduced of the dielectric multilayer film for making the dichroic mirror 403 adapt to the multiple wavelengths, and designing of the dichroic mirror 403 becomes easier.

Therefore, in the laser converging unit 400, the optical path from the mirror 402 via the reflective spatial light modulator 410 and the 4f lens unit 420 to the dichroic mirror 403 is set along the XY plane, and the optical path from the dichroic mirror 403 to the converging lens unit 430 is set along the Z-axis direction.

As illustrated in FIG. 9, in the laser output unit 300, the optical path of the laser light L is set along the X-axis direction or the Y-axis direction (plane parallel to the main surface 301a). Specifically, the optical path from the laser oscillator 310 to the mirror 303, and the optical path from the mirror 304 via the λ/2 wave plate unit 330, the polarizing plate unit 340, and the beam expander 350 to the mirror unit 360 are set along the X-axis direction, and the optical path from the mirror 303 via the shutter 320 to the mirror 304, and the optical path from the mirror 362 to the mirror 363 in the mirror unit 360 are set along the Y-axis direction.

Here, as illustrated in FIG. 11, the laser light L having traveled to the laser converging unit 400 from the laser output unit 300 along the Z-axis direction is reflected by the mirror 402 in a direction parallel to the XY plane, and enters the reflective spatial light modulator 410. At this time, in the plane parallel to the XY plane, an acute angle α is formed by the optical axis of the laser light L entering the reflective spatial light modulator 410 and the optical axis of the laser light L emitted from the reflective spatial light modulator 410. On the other hand, as described above, in the laser output unit 300, the optical path of the laser light L is set along the X-axis direction or the Y-axis direction.

Therefore, in the laser output unit 300, it is necessary to cause the λ/2 wave plate unit 330 and the polarizing plate unit 340 to function not only as the output adjusting unit configured to adjust the output of the laser light L but also as the polarization direction adjusting unit configured to adjust the polarization direction of the laser light L.

[λ/2 Wave Plate Unit and Polarizing Plate Unit]

Figure 14:
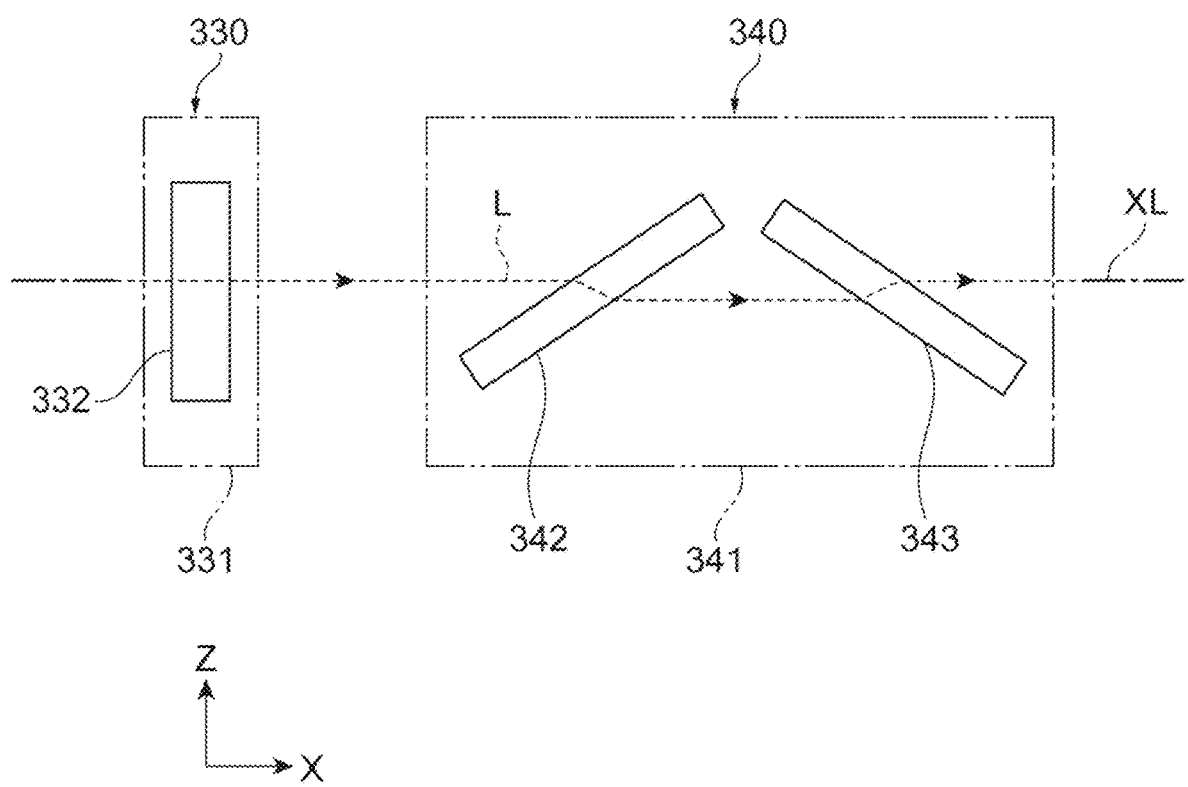
FIG. 14 is a diagram illustrating an optical arrangement relationship between a $\lambda/2$ wave plate unit and a polarizing plate unit in the laser output unit of FIG. 9.

As illustrated in FIG. 14, the λ/2 wave plate unit 330 includes a holder (first holder) 331 and λ/2 wave plate 332. The holder 331 holds the λ/2 wave plate 332 so that the λ/2 wave plate 332 is rotatable about an axis (first axis) XL parallel to the X-axis direction as the center. In a case where the laser light L enters with its polarization direction inclined by an angle θ with respect to its optical axis (for example, a fast axis), the λ/2 wave plate 332 rotates the polarization direction by an angle 2θ with the axis XL as the center to emit the laser light L (see FIG. 15(a)).

The polarizing plate unit 340 includes a holder (second holder) 341, a polarizing plate (polarizing member) 342, and an optical path correcting plate (optical path correcting member) 343. The holder 341 holds the polarizing plate 342 and the optical path correcting plate 343 so that the polarizing plate 342 and the optical path correcting plate 343 are integrally rotatable about the axis (the second axis) XL as the center. A light entrance surface and a light exit surface of the polarizing plate 342 are inclined by a predetermined angle (for example, a Brewster angle). In a case where the laser light L has entered, the polarizing plate 342 transmits a P-polarized component of the laser light L coincident with the polarization axis of the polarizing plate 342, and reflects or absorbs an S-polarized component of the laser light L (see FIG. 15(b)). A light entrance surface and a light exit surface of the optical path correcting plate 343 are inclined to an opposite side from the light entrance surface and the light exit surface of the polarizing plate 342. The optical path correcting plate 343 returns the optical axis of the laser light L to the axis XL, the laser light L having deviated from the axis XL due to being transmitted through the polarizing plate 342.

As described above, in the laser converging unit 400, in the plane parallel to the XY plane, the acute angle α is formed by the optical axis of the laser light L entering the reflective spatial light modulator 410 and the optical axis of the laser light L emitted from the reflective spatial light modulator 410 (see FIG. 11). On the other hand, in the laser output unit 300, the optical path of the laser light L is set along the X-axis direction or the Y-axis direction (see FIG. 9).

Therefore, in the polarizing plate unit 340, the polarizing plate 342 and the optical path correcting plate 343 are integrally rotated about the axis XL as the center, and as illustrated in FIG. 15(b), the polarization axis of the polarizing plate 342 is inclined by the angle α with respect to the direction parallel to the Y-axis direction. Thus, the polarization direction of the laser light L emitted from the polarizing plate unit 340 is inclined by the angle α with respect to the direction parallel to the Y-axis direction. As a result, the laser light L is reflected as the P-polarized light in the reflective spatial light modulator 410 and the laser light L is reflected as the S-polarized light in the dichroic mirror 403, and the polarization direction of the laser light L converged at the object to be processed 1 supported by the support table 230 is in the direction parallel to the X-axis direction.

As illustrated in FIG. 15(b), the polarization direction of the laser light L entering the polarizing plate unit 340 is adjusted, and the light intensity of the laser light L emitted from the polarizing plate unit 340 is adjusted. The adjustment of the polarization direction of the laser light L entering the polarizing plate unit 340 is performed by rotating the λ/2 wave plate 332 about the axis XL as the center in the λ/2 wave plate unit 330, and as illustrated in FIG. 15(a), by adjusting the angle of the optical axis of the λ/2 wave plate 332 with respect to the polarization direction (for example, the direction parallel to the Y-axis direction) of the laser light L entering the λ/2 wave plate 332.

As described above, in the laser output unit 300, the λ/2 wave plate unit 330 and the polarizing plate unit 340 function not only as the output adjusting unit configured to adjust the output of the laser light L (in the example described above, an output attenuating unit), but also as the polarization direction adjusting unit configured to adjust the polarization direction of the laser light L.

[4f Lens Unit]

Figure 16:
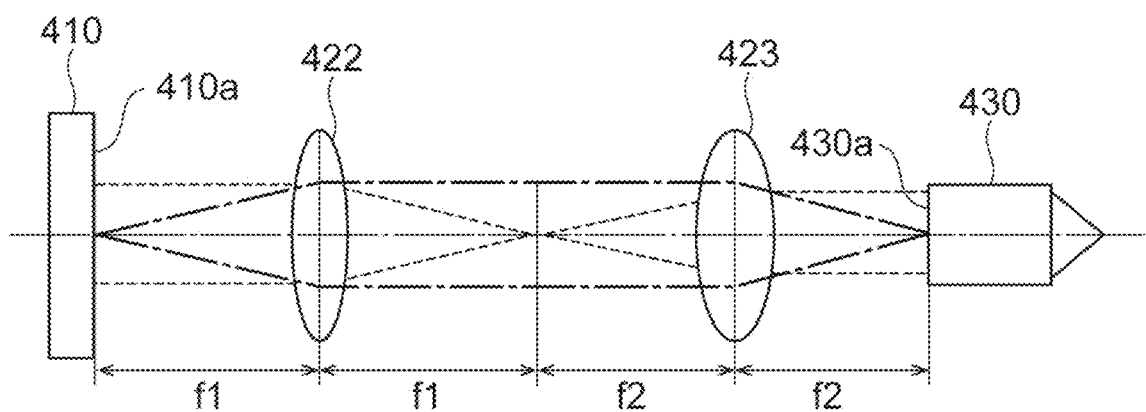
FIG. 16 is a diagram illustrating an optical arrangement relationship among a reflective spatial light modulator, a 4f lens unit, and a converging lens unit in the laser converging unit of FIG. 11.

As described above, the pair of lenses 422 and 423 of the 4f lens unit 420 constitutes the double telecentric optical system in which the reflective surface 410a of the reflective spatial light modulator 410 and the entrance pupil plane 430a of the converging lens unit 430 are in the imaging relationship. Specifically, as illustrated in FIG. 16, the distance of the optical path between the lens 422 on the reflective spatial light modulator 410 side and the reflective surface 410a of the reflective spatial light modulator 410 is a first focal length f1 of the lens 422, the distance of the optical path between the lens 423 on the converging lens unit 430 side and the entrance pupil plane 430a of the converging lens unit 430 is a second focal length f2 of the lens 423, and the distance of the optical path between the lens 422 and the lens 423 is a sum of the first focal length f1 and the second focal length f2 (that is, f1+f2). In the optical path from the reflective spatial light modulator 410 to the converging lens unit 430, the optical path between the pair of lenses 422 and 423 is a straight line.

In the laser processing device 200, from a viewpoint of increasing an effective diameter of the laser light L on the reflective surface 410a of the reflective spatial light modulator 410, a magnification M of the double telecentric optical system satisfies 0.5<M<1 (reduction system). As the effective diameter is increased of the laser light L on the reflective surface 410a of the reflective spatial light modulator 410, the laser light L is modulated with a high-precision phase pattern. From a viewpoint of inhibiting the optical path from becoming longer of the laser light L from the reflective spatial light modulator 410 to the converging lens unit 430, it is more preferable that 0.6≤M≤0.95. Here, (the magnification M of the double telecentric optical system)=(the size of the image on the entrance pupil plane 430a of the converging lens unit 430)/(the size of the object on the reflective surface 410a of the reflective spatial light modulator 410). In the case of the laser processing device 200, the magnification M of the double telecentric optical system, the first focal length f1 of the lens 422, and the second focal length f2 of the lens 423 satisfy M=f2/f1.

From a viewpoint of reducing the effective diameter of the laser light L on the reflective surface 410a of the reflective spatial light modulator 410, the magnification M of the double telecentric optical system may satisfy 1<M<2 (enlargement system). As the effective diameter is reduced of the laser light L on the reflective surface 410a of the reflective spatial light modulator 410, the magnification can be reduced of the beam expander 350 (see FIG. 9), and in the plane parallel to the XY plane, the angle α (see FIG. 11) is reduced formed by the optical axis of the laser light L entering the reflective spatial light modulator 410 and the optical axis of the laser light L emitted from the reflective spatial light modulator 410. From the viewpoint of inhibiting the optical path from becoming longer of the laser light L from the reflective spatial light modulator 410 to the converging lens unit 430, it is more preferable that 1.05≤M≤1.7.

Figure 17:
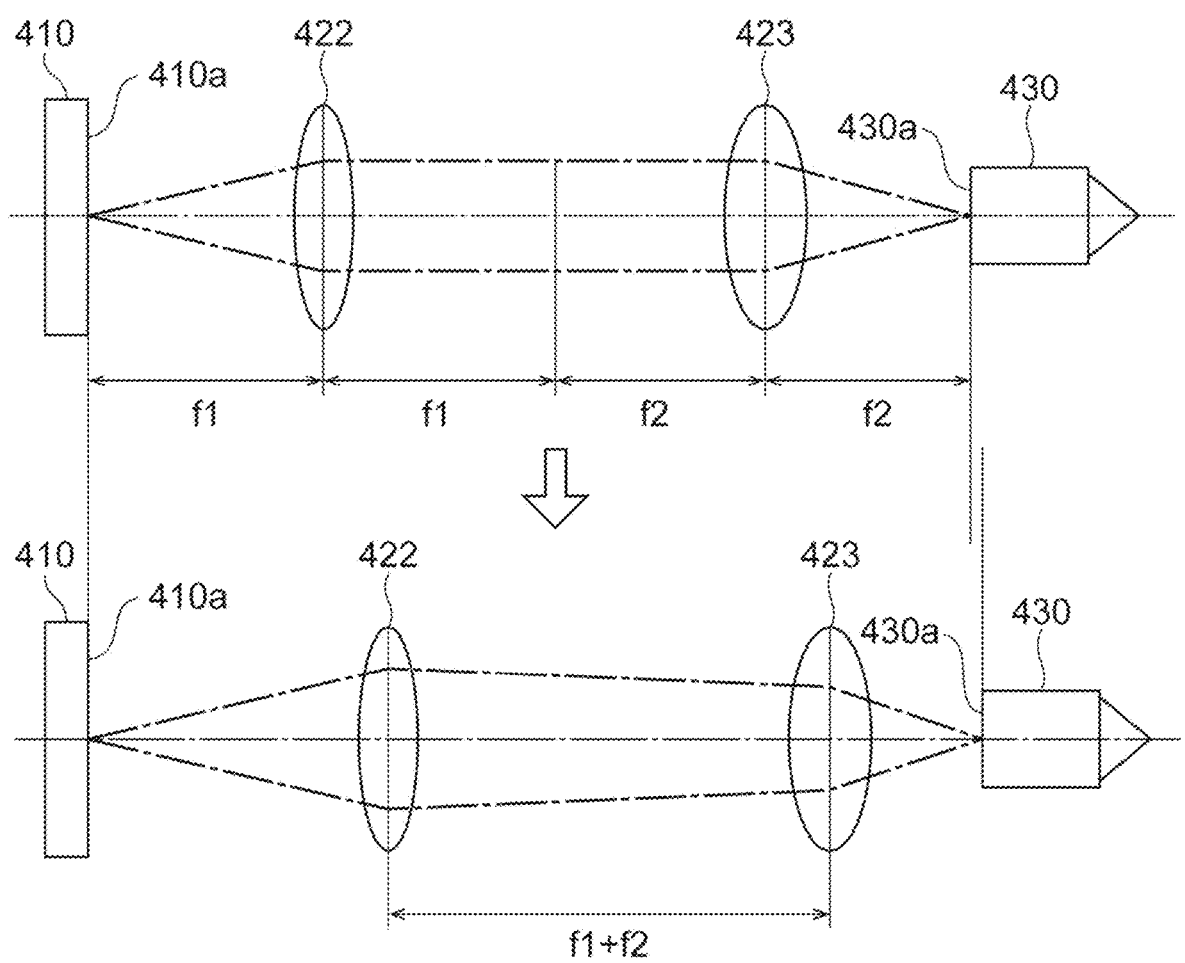
FIG. 17 is a diagram illustrating movement of a conjugate point due to movement of the 4f lens unit in FIG. 16.

In the 4f lens unit 420, since the magnification M of the double telecentric optical system is not 1, as illustrated in FIG. 17, when the pair of lenses 422 and 423 moves along the optical axis, a conjugate point on the converging lens unit 430 side moves. Specifically, in the case of the magnification M<1 (reduction system), when the pair of lenses 422 and 423 moves to the converging lens unit 430 side along the optical axis, the conjugate point on the converging lens unit 430 side moves to an opposite side from the reflective spatial light modulator 410. On the other hand, in the case of the magnification M>1 (enlargement system), when the pair of lenses 422 and 423 moves to the reflective spatial light modulator 410 side along the optical axis, the conjugate point on the converging lens unit 430 side moves to an opposite side from the reflective spatial light modulator 410.

Thus, for example, in a case where a shift occurs in a mounting position of the converging lens unit 430, the conjugate point on the converging lens unit 430 side is aligned with the entrance pupil plane 430a of the converging lens unit 430. In the 4f lens unit 420, as illustrated in FIG. 11, a plurality of long holes 421a extending in the Y-axis direction is formed in the bottom wall of the holder 421, and by bolt fixing via the long holes 421a, the holder 421 is secured to the bottom surface 401b of the housing 401. Thus, the position adjustment of the pair of lenses 422 and 423 in the direction along the optical axis is performed by adjusting a secured position of the holder 421 with respect to the bottom surface 401b of the housing 401 along the Y-axis direction.

[Function and Effect]

The laser processing device 200 includes: the device frame 210; the support table 230 attached to the device frame 210, the support table 230 supporting the object to be processed 1; the laser output unit 300 attached to the device frame 210; and the laser converging unit 400 attached to the device frame 210 so as to be movable with respect to the laser output unit 300. The laser output unit 300 includes the laser oscillator 310 configured to emit the laser light L. The laser converging unit 400 includes: the reflective spatial light modulator 410 configured to reflect the laser light L while modulating the laser light L; the converging lens unit 430 configured to converge the laser light L at the object to be processed 1; and the pair of lenses 422 and 423 constituting the double telecentric optical system in which the reflective surface 410a of the reflective spatial light modulator 410 and the entrance pupil plane 430a of the converging lens unit 430 are in the imaging relationship.

In the laser processing device 200, the laser converging unit 400 including the reflective spatial light modulator 410, the converging lens unit 430, and the pair of lenses 422 and 423 is movable with respect to the laser output unit 300 including the laser oscillator 310. Therefore, for example, as compared with a case where all of the components arranged on the optical path of the laser light L from the laser oscillator 310 to the converging lens unit 430 are moved, the weight can be reduced of the laser converging unit 400 to be moved, and the second moving mechanism 240 configured to move the laser converging unit 400 can be downsized. Moreover, the reflective spatial light modulator 410, the converging lens unit 430, and the pair of lenses 422 and 423 are integrally moved and the mutual positional relationship is maintained, so that the image of the laser light L on the reflective surface 410a of the reflective spatial light modulator 410 can be accurately transferred to the entrance pupil plane 430a of the converging lens unit 430. Accordingly, with the laser processing device 200, it is possible to move the components of the converging lens unit 430 side with respect to the object to be processed 1 while inhibiting the increase in size of the device.

In the laser processing device 200, the emission direction (Z-axis direction) of the laser light L from the laser output unit 300 coincides with the moving direction (Z-axis direction) of the laser converging unit 400. Thus, even if the laser converging unit 400 moves with respect to the laser output unit 300, the position of the laser light L entering the laser converging unit 400 can be inhibited from changing.

In the laser processing device 200, the laser output unit 300 further includes the beam expander 350 configured to collimate the laser light L. Thus, even if the laser converging unit 400 moves with respect to the laser output unit 300, the diameter of the laser light L entering the laser converging unit 400 can be inhibited from changing. Note that, even if the laser light L is not converted to perfect parallel light by the beam expander 350 and, for example, the laser light L has some divergence angle, the laser light L can be collimated in the reflective spatial light modulator 410.

In the laser processing device 200, the laser converging unit 400 further includes the housing 401 within which the optical path of the laser light L from the reflective spatial light modulator 410 via the pair of lenses 422 and 423 to the converging lens unit 430 is set, and the housing 401 is provided with the light entrance unit 401a configured to allow the laser light L emitted from the laser output unit 300 to enter the housing 401. Thus, while maintaining a constant state of the optical path of the laser light L from the reflective spatial light modulator 410 via the pair of lenses 422 and 423 to the converging lens unit 430, the laser converging unit 400 can be moved with respect to the laser output unit 300.

In the laser processing device 200, the laser converging unit 400 further includes the mirror 402 arranged in the housing 401 so as to face the light entrance unit 401a in the moving direction (Z-axis direction) of the laser converging unit 400, and the mirror 402 reflects the laser light L having entered the housing 401 from the light entrance unit 401a toward the reflective spatial light modulator 410. Thus, the laser light L having entered the laser converging unit 400 from the laser output unit 300 is allowed to enter the reflective spatial light modulator 410 at a desired angle.

In the laser processing device 200, the support table 230 is attached to the device frame 210 so as to be movable along a plane (XY plane) perpendicular to the moving direction (Z-axis direction) of the laser converging unit 400. Thus, in addition to locating the converging point of the laser light L at a desired position with respect to the object to be processed 1, scanning with the laser light L can be performed with respect to the object to be processed 1, in a direction parallel to the plane perpendicular to the moving direction of the laser converging unit 400.

In the laser processing device 200, the support table 230 is attached to the device frame 210 via the first moving mechanism 220, and the laser converging unit 400 is attached to the device frame 210 via the second moving mechanism 240. Thus, it is possible to reliably perform the movement of each of the support table 230 and the laser converging unit 400.

The laser processing device 200 includes: the device frame 210; the support table 230 attached to the device frame 210, the support table 230 supporting the object to be processed 1; the laser output unit 300 detachable with respect to the device frame 210; and the laser converging unit 400 attached to the device frame 210. The laser output unit 300 includes the laser oscillator 310 configured to emit the laser light L, and the λ/2 wave plate unit 330 and the polarizing plate unit 340 configured to adjust the output of the laser light L. The laser converging unit 400 includes: the reflective spatial light modulator 410 configured to reflect the laser light L while modulating the laser light L; the converging lens unit 430 configured to converge the laser light L at the object to be processed 1; and the pair of lenses 422 and 423 constituting the double telecentric optical system in which the reflective surface 410a of the reflective spatial light modulator 410 and the entrance pupil plane 430a of the converging lens unit 430 are in the imaging relationship. In this case, the laser converging unit 400 may be secured to the device frame 210. The support table 230 may be attached to the device frame 210 so as to be movable not only along the X-axis direction and the Y-axis direction but also along the Z-axis direction.

In the laser processing device 200, the laser output unit 300 including the laser oscillator 310, the λ/2 wave plate unit 330, and the polarizing plate unit 340 is detachable with respect to the device frame 210, separately from the laser converging unit 400 including the reflective spatial light modulator 410, the converging lens unit 430, and the pair of lenses 422 and 423. Therefore, in a case where the wavelength of the laser light L suitable for processing varies depending on the specifications of the object to be processed 1, processing conditions, and the like, it is possible to collectively replace the laser oscillator 310 configured to emit the laser light L having a desired wavelength, and the λ/2 wave plate unit 330 and the polarizing plate unit 340 having wavelength dependence. Accordingly, with the laser processing device 200, a plurality of the laser oscillators 310 can be used having respective wavelengths of the laser light L different from each other.

In the laser processing device 200, the laser output unit 300 further includes the mounting base 301 configured to support the laser oscillator 310, the λ/2 wave plate unit 330, and the polarizing plate unit 340 and to be detachable with respect to the device frame 210, and the laser output unit 300 is attached to the device frame 210 via the mounting base 301. Thus, the laser output unit 300 can be easily attached to and detached from the device frame 210.

In the laser processing device 200, the laser output unit 300 further includes the mirrors 362 and 363 configured to adjust the optical axis of the laser light L emitted from the laser output unit 300. Thus, for example, when the laser output unit 300 is attached to the device frame 210, it is possible to adjust the position and angle of the optical axis of the laser light L entering the laser converging unit 400.

In the laser processing device 200, the λ/2 wave plate unit 330 and the polarizing plate unit 340 adjust the polarization direction of the laser light L. Thus, for example, when the laser output unit 300 is attached to the device frame 210, it is possible to adjust the polarization direction of the laser light L entering the laser converging unit 400, and consequently the polarization direction of the laser light L emitted from the laser converging unit 400.

In the laser processing device 200, the λ/2 wave plate unit 330 and the polarizing plate unit 340 include the λ/2 wave plate 332 and the polarizing plate 342. Thus, it is possible to collectively replace the λ/2 wave plate 332 and the polarizing plate 342 having wavelength dependence together with the laser oscillator 310.

In the laser processing device 200, the laser output unit 300 further includes the beam expander 350 configured to collimate the laser light L while adjusting the diameter of the laser light L. Thus, for example, even in a case where the laser converging unit 400 moves with respect to the laser output unit 300, a constant state can be maintained of the laser light L entering the laser converging unit 400.

In the laser processing device 200, the reflective spatial light modulator 410, the converging lens unit 430, and the pair of lenses 422 and 423 are adapted to the wavelength bands of from 500 nm to 550 nm, from 1000 nm to 1150 nm, and from 1300 nm to 1400 nm. Thus, the laser output unit 300 configured to emit the laser light L in each of the wavelength bands can be attached to the laser processing device 200. Note that, the laser light L in the wavelength band of from 500 nm to 550 nm is suitable for internal absorption type laser processing for a substrate made of sapphire, for example. The laser light L in each of the wavelength bands of from 1000 nm to 1150 nm and from 1300 nm to 1400 nm is suitable for internal absorption type laser processing for a substrate made of silicon, for example.

The laser processing device 200 includes: the support table 230 configured to support the object to be processed 1; the laser oscillator 310 configured to emit the laser light L; the reflective spatial light modulator 410 configured to reflect the laser light L while modulating the laser light L; the converging lens unit 430 configured to converge the laser light L at the object to be processed 1; and the pair of lenses 422 and 423 constituting the double telecentric optical system in which the reflective surface 410a of the reflective spatial light modulator 410 and the entrance pupil plane 430a of the converging lens unit 430 are in the imaging relationship. In the optical path of the laser light L from the reflective spatial light modulator 410 to the converging lens unit 430, at least the optical path of the laser light L passing through the pair of lenses 422 and 423 (that is, from the lens 422 on the reflective spatial light modulator 410 side to the lens 423 on the converging lens unit 430 side) is a straight line. The magnification M of the double telecentric optical system satisfies $0.5<M<1$ or $1<M<2$. Note that, in the laser processing device 200, the magnification M of the double telecentric optical system, the first focal length f1 of the lens 422, and the second focal length f2 of the lens 423 satisfy $M=f2/f1$. In this case, the laser converging unit 400 may be secured to the device frame 210. The support table 230 may be attached to the device frame 210 so as to be movable not only along the X-axis direction and the Y-axis direction but also along the Z-axis direction.

In the laser processing device 200, the magnification M of the double telecentric optical system is not 1. Thus, when the pair of lenses 422 and 423 moves along the optical axis, the conjugate point on the converging lens unit 430 side moves. Specifically, in the case of the magnification M<1 (reduction system), when the pair of lenses 422 and 423 moves to the converging lens unit 430 side along the optical axis, the conjugate point on the converging lens unit 430 side moves to an opposite side from the reflective spatial light modulator 410. On the other hand, in the case of the magnification M>1 (enlargement system), when the pair of lenses 422 and 423 moves to the reflective spatial light modulator 410 side along the optical axis, the conjugate point on the converging lens unit 430 side moves to an opposite side from the reflective spatial light modulator 410. Therefore, for example, in a case where a shift occurs in the mounting position of the converging lens unit 430, the conjugate point on the converging lens unit 430 side can be aligned with the entrance pupil plane 430a of the converging lens unit 430. Moreover, at least the optical path of the laser light L from the lens 422 on the reflective spatial light modulator 410 side to the lens 423 on the converging lens unit 430 side is a straight line, the pair of lenses 422 and 423 can be easily moved along the optical axis. Accordingly, with the laser processing device 200, it is possible to easily and accurately transfer the image of the laser light L on the reflective surface 410a of the reflective spatial light modulator 410 to the entrance pupil plane 430a of the converging lens unit 430.

By setting $0.5<M<1$, the effective diameter can be increased of the laser light L on the reflective surface 410a of the reflective spatial light modulator 410, and the laser light L can be modulated with a high-precision phase pattern. On the other hand, by setting $1<M<2$, the effective diameter can be reduced of the laser light L on the reflective surface 410a of the reflective spatial light modulator 410, and the angle α can be reduced formed by the optical axis of the laser light L entering the reflective spatial light modulator 410 and the optical axis of the laser light L emitted from the reflective spatial light modulator 410. It is important to suppress the incident angle and the reflection angle of the laser light L with respect to the reflective spatial light modulator 410 for inhibiting degradation of diffraction efficiency and sufficiently exerting performance of the reflective spatial light modulator 410.

In the laser processing device 200, the magnification M may satisfy $0.6 \leq M \leq 0.95$. Thus, it is possible to more reliably inhibit the optical path from becoming longer of the laser light L from the reflective spatial light modulator 410 to the converging lens unit 430 while maintaining the effect exerted in the case of $0.5<M<1$.

In the laser processing device 200, the magnification M may satisfy $1.05 \leq M \leq 1.7$. Thus, it is possible to more reliably inhibit the optical path from becoming longer of the laser light L from the reflective spatial light modulator 410 to the converging lens unit 430 while maintaining the effect exerted in the case of $1<M<2$.

In the laser processing device 200, the pair of lenses 422 and 423 is held by the holder 421, the holder 421 maintains the constant mutual positional relationship between the pair of lenses 422 and 423 in the direction along the optical axis of the laser light L, and the position adjustment of the pair of lenses 422 and 423 in the direction along the optical axis of the laser light L (Y-axis direction) is performed by the position adjustment of the holder 421. Thus, while maintaining the constant mutual positional relationship between the pair of lenses 422 and 423, it is possible to easily and reliably perform the position adjustment of the pair of lenses 422 and 423 (and consequently the position adjustment of the conjugate point).

The laser processing device 200 includes: the support table 230 configured to support the object to be processed 1; the laser oscillator 310 configured to emit the laser light L; the reflective spatial light modulator 410 configured to reflect the laser light L while modulating the laser light L; the converging lens unit 430 configured to converge the laser light L at the object to be processed 1; the pair of lenses 422 and 423 constituting the double telecentric optical system in which the reflective surface 410a of the reflective spatial light modulator 410 and the entrance pupil plane 430a of the converging lens unit 430 are in the imaging relationship; and the dichroic mirror 403 configured to reflect the laser light L having passed through the pair of lenses 422 and 423 toward the converging lens unit 430. The reflective spatial light modulator 410 reflects the laser light L at an acute angle along a predetermined plane (plane including the optical path of the laser light L entering and exiting the reflective spatial light modulator 410, plane parallel to the XY plane). The optical path of the laser light L from the reflective spatial light modulator 410 via the pair of lenses 422 and 423 to the dichroic mirror 403 is set along the plane. The optical path of the laser light L from the dichroic mirror 403 to the converging lens unit 430 is set along a direction (Z-axis direction) crossing the plane. In this case, the laser converging unit 400 may be secured to the device frame 210. The support table 230 may be attached to the device frame 210 so as to be movable not only along the X-axis direction and the Y-axis direction but also along the Z-axis direction.

In the laser processing device 200, the optical path of the laser light L from the reflective spatial light modulator 410 via the pair of lenses 422 and 423 to the dichroic mirror 403 is set along the predetermined plane, and the optical path of the laser light L from the dichroic mirror 403 to the converging lens unit 430 is set along the direction crossing the plane. Thus, for example, the reflective spatial light modulator 410 can be made to reflect the laser light L as the P-polarized light and the mirror can be made to reflect the laser light L as the S-polarized light. This is important for accurately transferring the image of the laser light L on the reflective surface 410a of the reflective spatial light modulator 410 to the entrance pupil plane 430a of the converging lens unit 430. Further, the reflective spatial light modulator 410 reflects the laser light L at an acute angle. It is important to suppress the incident angle and the reflection angle of the laser light L with respect to the reflective spatial light modulator 410 for inhibiting degradation of diffraction efficiency and sufficiently exerting performance of the reflective spatial light modulator 410. As described above, with the laser processing device 200, the image of the laser light L on the reflective surface 410a of the reflective spatial light modulator 410 can be accurately transferred to the entrance pupil plane 430a of the converging lens unit 430.

In the laser processing device 200, the optical path of the laser light L from the dichroic mirror 403 to the converging lens unit 430 is set along a direction orthogonal to the above-described plane (plane parallel to the XY plane), and the dichroic mirror 403 reflects the laser light L at a right angle. Thus, the optical path of the laser light L from the reflective spatial light modulator 410 to the converging lens unit 430 can be routed at a right angle.

In the laser processing device 200, the dichroic mirror 403 is a mirror configured to reflect the laser light L having passed through the pair of lenses 422 and 423 toward the converging lens unit 430. Thus, part of the laser light L transmitted through the dichroic mirror 403 can be used for various purposes.

In the laser processing device 200, the reflective spatial light modulator 410 reflects the laser light L as the P-polarized light, and the dichroic mirror 403 reflects the laser light L as the S-polarized light. Thus, the image of the laser light L on the reflective surface 410a of the reflective spatial light modulator 410 can be accurately transferred to the entrance pupil plane 430a of the converging lens unit 430.

The laser processing device 200 further includes the λ/2 wave plate unit 330 and the polarizing plate unit 340 arranged on the optical path of the laser light L from the laser oscillator 310 to the reflective spatial light modulator 410, the λ/2 wave plate unit 330 and the polarizing plate unit 340 adjusting the polarization direction of the laser light L. Thus, it is possible to adjust the polarization direction of the laser light L in preparation for the fact that the reflective spatial light modulator 410 reflects the laser light L at an acute angle, so that the optical path of the laser light L from the laser oscillator 310 to the reflective spatial light modulator 410 can be routed at a right angle.

The laser processing device 200 includes: the support table 230 configured to support the object to be processed 1; the laser oscillator 310 configured to emit the laser light L; the reflective spatial light modulator 410 configured to reflect the laser light L while modulating the laser light L; the converging lens unit 430 configured to converge the laser light L at the object to be processed 1; the pair of lenses 422 and 423 constituting the double telecentric optical system in which the reflective surface 410a of the reflective spatial light modulator 410 and the entrance pupil plane 430a of the converging lens unit 430 are in the imaging relationship; the dichroic mirror 403 configured to reflect the laser light L having passed through the pair of lenses 422 and 423 toward the converging lens unit 430; and one of the distance measuring sensors 450 configured to acquire the displacement data of the laser light entrance surface of the object to be processed 1. The optical path of the laser light L from the dichroic mirror 403 to the converging lens unit 430 is set along a first direction (Z-axis direction). The optical path of the laser light L from the reflective spatial light modulator 410 via the pair of lenses 422 and 423 to the dichroic mirror 403 is set along a second direction (Y-axis direction) perpendicular to the first direction. The one of the distance measuring sensors 450 is arranged on one side of the converging lens unit 430 in a third direction (X-axis direction) perpendicular to the first direction and the second direction. In this case, the laser converging unit 400 may be secured to the device frame 210. The support table 230 may be attached to the device frame 210 so as to be movable not only along the X-axis direction and the Y-axis direction but also along the Z-axis direction.

In the laser processing device 200, scanning with the laser light L is performed with respect to the object to be processed 1 such that the one of the distance measuring sensors 450 is relatively advanced with respect to the converging lens unit 430, whereby the displacement data of the laser light entrance surface at an arbitrary position of the object to be processed 1 can be acquired before the laser light L is emitted to the position. Thus, for example, scanning with the laser light L can be performed with respect to the object to be processed 1 such that a constant distance is maintained between the laser light entrance surface of the object to be processed 1 and the converging point of the laser light L. Further, one of the distance measuring sensors 450 is arranged on one side with respect to a plane (plane parallel to the YZ plane) on which the optical path of the laser light L from the reflective spatial light modulator 410 to the converging lens unit 430 is arranged. That is, the one of the distance measuring sensors 450 is efficiently arranged with respect to the components arranged on the optical path of the laser light L from the reflective spatial light modulator 410 to the converging lens unit 430. Accordingly, with the laser processing device 200, it is possible to acquire the displacement data of the laser light entrance surface of the object to be processed 1 while inhibiting the increase in size of the device.

In the laser processing device 200, the dichroic mirror 403 is a mirror configured to reflect the laser light L having passed through the pair of lenses 422 and 423 toward the converging lens unit 430. Thus, part of the laser light L transmitted through the dichroic mirror 403 can be used for various purposes.

In the laser processing device 200, the dichroic mirror 403 reflects the laser light L as the S-polarized light. Thus, scanning with the laser light L is performed with respect to the object to be processed 1 along the third direction (X-axis direction), whereby the scanning direction of the laser light L and the polarization direction of the laser light L can be made to coincide with each other. For example, in a case where a modified region is formed within the object to be processed 1 along the line to cut, the scanning direction of the laser light L and the polarization direction of the laser light L are made to coincide with each other, whereby the modified region can be efficiently formed.

The laser processing device 200 further includes: the housing 401 configured to support at least the reflective spatial light modulator 410, the converging lens unit 430, the pair of lenses 422 and 423, the dichroic mirror 403, and the one of the distance measuring sensors 450; and the second moving mechanism 240 configured to move the housing 401 along the first direction (Z-axis direction). The converging lens unit 430 and the one of the distance measuring sensors 450 are attached to the end 401d of the housing 401 in the second direction (Y-axis direction). The second moving mechanism 240 is attached to the one side surface 401e of the housing 401 in the third direction (X-axis direction).

Thus, it is possible to integrally move the reflective spatial light modulator 410, the converging lens unit 430, the pair of lenses 422 and 423, the dichroic mirror 403, and the one of the distance measuring sensors 450 while inhibiting the increase in size of the device.

The laser processing device 200 further includes the drive mechanism 440 configured to move the converging lens unit 430 along the first direction (Z-axis direction). The converging lens unit 430 is attached to the end 401d of the housing 401 in the second direction (Y-axis direction) via the drive mechanism 440. Thus, for example, the converging lens unit 430 can be moved such that a constant distance is maintained between the laser light entrance surface of the object to be processed 1 and the converging point of the laser light L.

In the laser processing device 200, the reflective spatial light modulator 410 is attached to the end 401c of the housing 401 in the second direction (Y-axis direction). Thus, the components can be efficiently arranged with respect to the housing 401.

The laser processing device 200 further includes another of the distance measuring sensors 450 configured to acquire the displacement data of the laser light entrance surface of the object to be processed 1. The other of the distance measuring sensors 450 is arranged on the other side of the converging lens unit 430 in the third direction (X-axis direction). Thus, when scanning with the laser light L is performed with respect to the object to be processed 1 such that the one of the distance measuring sensors 450 is relatively advanced with respect to the converging lens unit 430, the one of the distance measuring sensors 450 can be used to acquire the displacement data of the laser light entrance surface. On the other hand, when scanning with the laser light L is performed with respect to the object to be processed 1 such that the other of the distance measuring sensors 450 is relatively advanced with respect to the converging lens unit 430, the other of the distance measuring sensors 450 can be used to acquire the displacement data of the laser light entrance surface. Further, the one of the distance measuring sensors 450 is arranged on one side with respect to the plane (plane parallel to the YZ plane) on which the optical path of the laser light L from the reflective spatial light modulator 410 to the converging lens unit 430 is arranged, and the other of the distance measuring sensors 450 is arranged on the other side with respect to the plane. Thus, the pair of distance measuring sensors 450 can be efficiently arranged with respect to the components arranged on the optical path of the laser light L from the reflective spatial light modulator 410 to the converging lens unit 430.

The laser output unit 300 includes: the laser oscillator 310 configured to emit the laser light L; the λ/2 wave plate unit 330 and the polarizing plate unit 340 configured to adjust the output of the laser light L emitted from the laser oscillator 310; the mirror unit 360 configured to externally emit the laser light L having passed through the λ/2 wave plate unit 330 and the polarizing plate unit 340; and the mounting base 301 including the main surface 301a on which the laser oscillator 310, the λ/2 wave plate unit 330, the polarizing plate unit 340, and the mirror unit 360 are arranged. The optical path of the laser light L from the laser oscillator 310 via the λ/2 wave plate unit 330 and the polarizing plate unit 340 to the mirror unit 360 is set along the plane parallel to the main surface 301a. The mirror unit 360 includes the mirrors 362 and 363 configured to adjust the optical axis of the laser light L, and externally emits the laser light L along the direction (Z-axis direction) crossing the plane. In this case, the laser converging unit 400 may be secured to the device frame 210. The support table 230 may be attached to the device frame 210 so as to be movable not only along the X-axis direction and the Y-axis direction but also along the Z-axis direction.

In the laser output unit 300, the laser oscillator 310, the λ/2 wave plate unit 330, the polarizing plate unit 340, and the mirror unit 360 are arranged on the main surface 301a of the mounting base 301. Thus, the mounting base 301 is attached to and detached from the device frame 210 of the laser processing device 200, whereby the laser output unit 300 can be easily attached to and detached from the laser processing device 200. The optical path of the laser light L from the laser oscillator 310 via the λ/2 wave plate unit 330 and the polarizing plate unit 340 to the mirror unit 360 is set along the plane parallel to the main surface 301a of the mounting base 301, and the mirror unit 360 externally emits the laser light L along the direction crossing the plane. Thus, for example, in a case where the emission direction of the laser light L is along the vertical direction, the height of the laser output unit 300 is reduced, so that the laser output unit 300 can be easily attached to and detached from the laser processing device 200. Further, the mirror unit 360 includes the mirrors 362 and 363 configured to adjust the optical axis of the laser light L. Thus, when the laser output unit 300 is attached to the device frame 210 of the laser processing device 200, it is possible to adjust the position and angle of the optical axis of the laser light L entering the laser converging unit 400. As described above, the laser output unit 300 can be easily attached to and detached from the laser processing device 200.

In the laser output unit 300, the mirror unit 360 externally emits the laser light L along a direction orthogonal to the plane parallel to the main surface 301a. Thus, adjustment can be facilitated of the optical axis of the laser light L in the mirror unit 360.

In the laser output unit 300, the λ/2 wave plate unit 330 and the polarizing plate unit 340 adjust the polarization direction of the laser light L emitted from the laser oscillator 310. Thus, when the laser output unit 300 is attached to the device frame 210 of the laser processing device 200, it is possible to adjust the polarization direction of the laser light L entering the laser converging unit 400, and consequently the polarization direction of the laser light L emitted from the laser converging unit 400.

In the laser output unit 300, the λ/2 wave plate unit 330 and the polarizing plate unit 340 include: the λ/2 wave plate 332 into which the laser light L emitted from the laser oscillator 310 enters along the axis XL (axis parallel to the main surface 301a); the holder 331 configured to hold the λ/2 wave plate 332 such that the λ/2 wave plate 332 is rotatable about the axis XL as the center; the polarizing plate 342 into which the laser light L having passed through the λ/2 wave plate 332 enters along the axis XL; and the holder 341 configured to hold the polarizing plate 342 such that the polarizing plate 342 is rotatable about the axis XL as the center. Thus, it is possible to adjust the output and polarization direction of the laser light L emitted from the laser oscillator 310 with a simple configuration. Further, the laser output unit 300 includes the λ/2 wave plate unit 330 and the polarizing plate unit 340 as described above, whereby it is possible to use the λ/2 wave plate 332 and the polarizing plate 342 corresponding to the wavelength of the laser light L emitted from the laser oscillator 310.

The laser output unit 300 further include the optical path correcting plate 343 held by the holder 341 so as to be rotatable integrally with the polarizing plate 342 about the axis XL as the center, the optical path correcting plate 343 returning the optical axis of the laser light L to the axis XL, the laser light having deviated from the axis XL due to being transmitted through the polarizing plate 342. Thus, it is possible to correct the shift of the optical path of the laser light L due to being transmitted through the polarizing plate 342.

In the laser output unit 300, the axis about which the λ/2 wave plate 332 rotates and the axis about which the polarizing plate 342 rotates are the axes XL and coincide with each other. That is, the λ/2 wave plate 332 and the polarizing plate 342 are rotatable about the same axis XL as the center. Thus, simplification and downsizing of the laser output unit 300 can be achieved.

In the laser output unit 300, the mirror unit 360 includes the support base 361 and the mirrors 362 and 363, the support base 361 is attached to the mounting base 301 so as to be position adjustable, the mirror 362 is attached to the support base 361 so as to be angle adjustable and reflects the laser light L having passed through the λ/2 wave plate unit 330 and the polarizing plate unit 340 along a direction parallel to the main surface 301a, and the mirror 363 is attached to the support base 361 so as to be angle adjustable and reflects the laser light L reflected by the mirror 362 along a direction crossing the main surface 301a. Thus, when the laser output unit 300 is attached to the device frame 210 of the laser processing device 200, it is possible to accurately adjust the position and angle of the optical axis of the laser light L entering the laser converging unit 400. Moreover, position adjustment is performed of the support base 361 with respect to the mounting base 301, whereby position adjustment can be performed of the mirrors 362 and 363 integrally and easily.

The laser output unit 300 further includes the beam expander 350 arranged on the optical path of the laser light L from the λ/2 wave plate unit 330 and the polarizing plate unit 340 to the mirror unit 360, the beam expander 350 collimating the laser light L while adjusting the diameter of the laser light L. Thus, even in a case where the laser converging unit 400 moves with respect to the laser output unit 300, a constant state can be maintained of the laser light L entering the laser converging unit 400.

The laser output unit 300 further includes the shutter 320 arranged on the optical path of the laser light L from the laser oscillator 310 to the λ/2 wave plate unit 330 and the polarizing plate unit 340, the shutter 320 opening and closing the optical path of the laser light L. Thus, switching ON/OFF of the output of the laser light L from the laser output unit 300 can be performed by switching ON/OFF of the output of the laser light L in the laser oscillator 310. In addition, with the shutter 320, it is possible to prevent the laser light L from being unexpectedly emitted from the laser output unit 300, for example.

Modification

In the above, the embodiments of the present disclosure have been described; however, the present disclosure is not limited to the embodiments described above.

Figure 18:
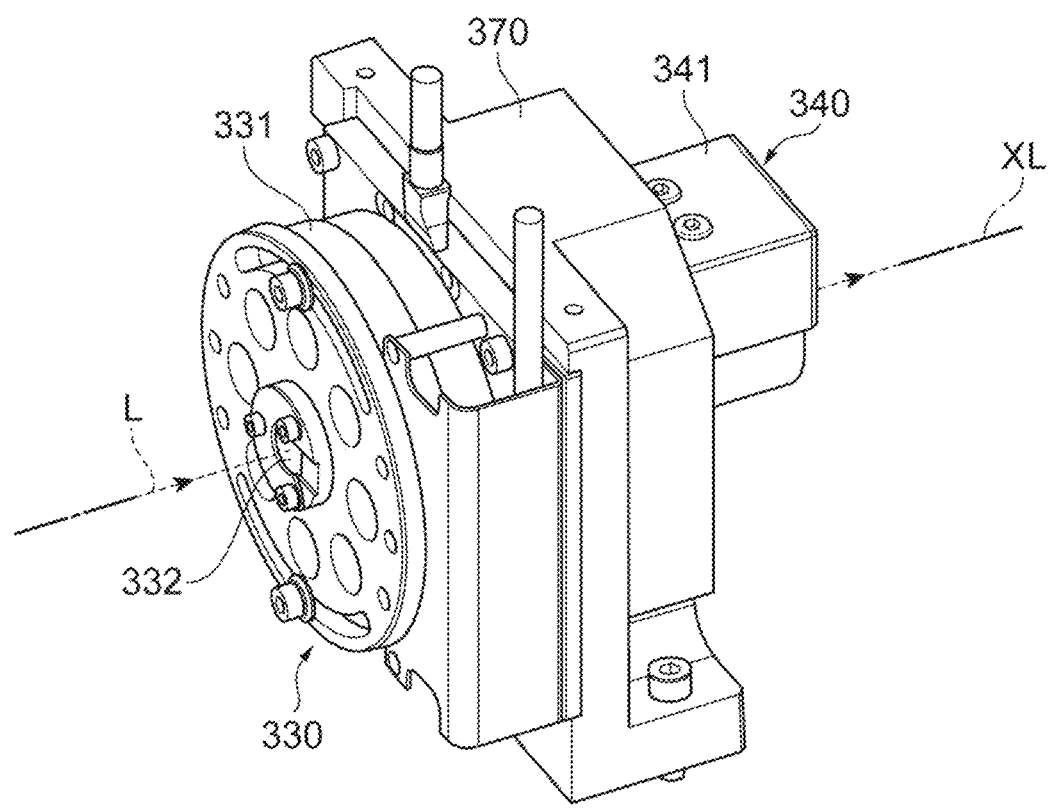
FIG. 18 is a perspective view of the $\lambda/2$ wave plate unit and the polarizing plate unit integrated together.
Figure 19:
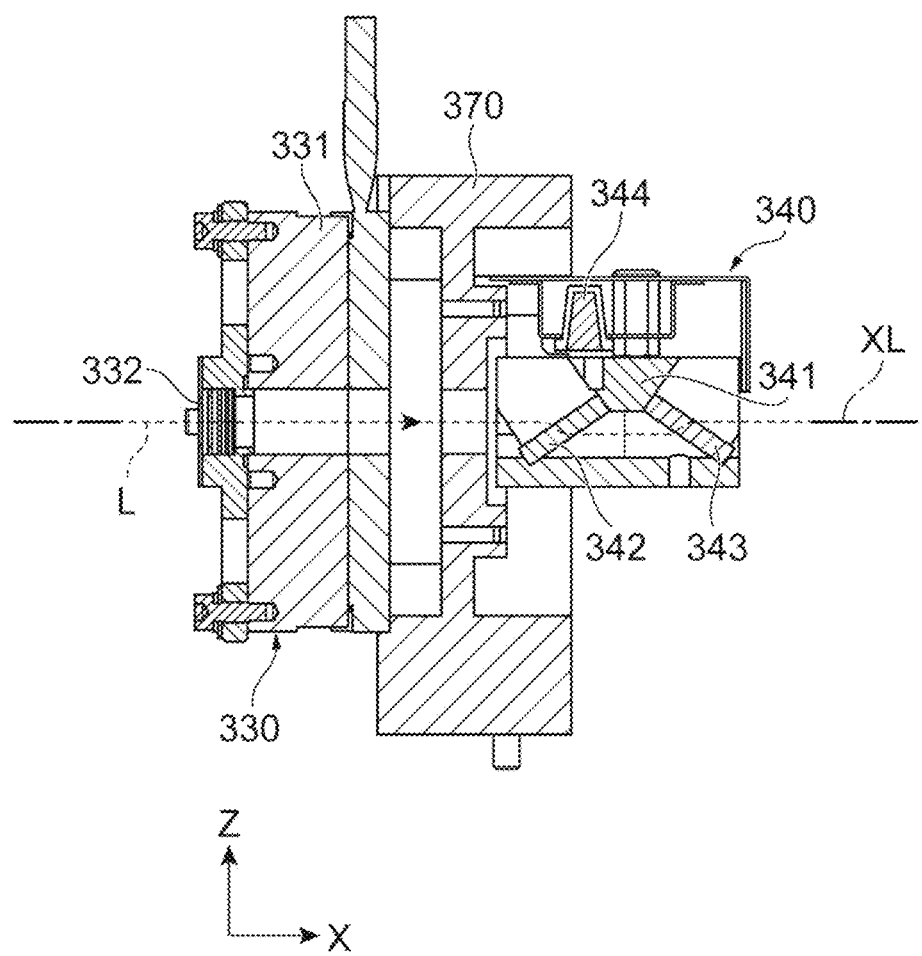
FIG. 19 is a sectional view of the $\lambda/2$ wave plate unit and the polarizing plate unit taken along the ZX plane of FIG. 18.

For example, as illustrated in FIGS. 18 and 19, the λ/2 wave plate unit 330 and the polarizing plate unit 340 may be integrated together. In this case, the holder 331 configured to hold the λ/2 wave plate 332 is attached to one end surface of a frame 370 so as to be rotatable about the axis XL as the center. The holder 341 configured to hold the polarizing plate 342 and the optical path correcting plate 343 is attached to the other end surface of the frame 370 so as to be rotatable about the axis XL as the center. The frame 370 is attached to the main surface 301a of the mounting base 301. The holder 341 is provided with a damper 344 configured to absorb the S-polarized component of the laser light L reflected by the polarizing plate 342.

Further, a polarizing member other than the polarizing plate 342 may be provided in the polarizing plate unit 340. As an example, a cube-shaped polarizing member may be used instead of the polarizing plate 342 and the optical path correcting plate 343. The cube-shaped polarizing member is a member having a rectangular parallelepiped shape, and is a member in which side surfaces facing each other in the member are a light entrance surface and a light exit surface, respectively, and a layer having a function of a polarizing plate is provided between the side surfaces.

The axis about which the λ/2 wave plate 332 rotates and the axis about which the polarizing plate 342 rotates do not have to coincide with each other.

The laser output unit 300 includes the mirrors 362 and 363 configured to adjust the optical axis of the laser light L emitted from the laser output unit 300; however, the laser output unit 300 only need to include at least one mirror configured to adjust the optical axis of the laser light L emitted from the laser output unit 300.

The imaging optical system constituting the double telecentric optical system in which the reflective surface 410a of the reflective spatial light modulator 410 and the entrance pupil plane 430a of the converging lens unit 430 are in the imaging relationship is not limited to the pair of lenses 422 and 423, and may be one including the first lens system (for example, a doublet, three or more lenses, or the like) on the reflective spatial light modulator 410 side, and the second lens system (for example, a doublet, three or more lenses, or the like) on the converging lens unit 430 side, or the like.

In the laser converging unit 400, the dichroic mirror 403 is the mirror configured to reflect the laser light L having passed through the pair of lenses 422 and 423 toward the converging lens unit 430; however, the mirror may be a total reflection mirror.

The converging lens unit 430 and the pair of distance measuring sensors 450 are attached to the end 401d of the housing 401 in the Y-axis direction; however, the converging lens unit 430 and the pair of distance measuring sensors 450 only need to be attached at a side closer to the end 401d from the center position of the housing 401 in the Y-axis direction. The reflective spatial light modulator 410 is attached to the end 401c of the housing 401 in the Y-axis direction; however, the reflective spatial light modulator 410 only need to be attached at a side closer to the end 401c from the center position of the housing 401 in the Y-axis direction. In addition, the distance measuring sensors 450 may be arranged only on one side of the converging lens unit 430 in the X-axis direction.

The laser processing device of the present disclosure is not limited to one configured to form a modified region within the object to be processed 1, and may be one configured to perform another laser processing such as ablation.

REFERENCE SIGNS LIST

1: object to be processed, 200: laser processing device, 210: device frame, 220: first moving mechanism, 230: support table (support unit), 240: second moving mechanism, 300: laser output unit (laser output device), 301: mounting base, 310: laser oscillator (laser light source), 320: shutter, 330: λ/2 wave plate unit (output adjusting unit, polarization direction adjusting unit), 331: holder (first holder), 332: λ/2 wave plate, 340: polarizing plate unit (output adjusting unit, polarization direction adjusting unit), 341: holder (second holder), 342: polarizing plate (polarizing member), 343: optical path correcting plate (optical path correcting member), 350: beam expander (laser light collimating unit), 360: mirror unit, 362: mirror (first mirror), 363: mirror (second mirror), 400: laser converging unit, 401: housing, 401*a*: light entrance unit, 401*c*: end, 401*d*: end, 401*e*: side surface, 402: mirror, 403: dichroic mirror (mirror), 410: reflective spatial light modulator, 410*a*: reflective surface, 421: holder, 422: lens (first lens system, imaging optical system), 423: lens (second lens system, imaging optical system), 430: converging lens unit (converging optical system), 440: drive mechanism, 450: distance measuring sensor (first sensor, second sensor), XL: axis, L: laser light.

The invention claimed is:

1. A laser processing device comprising:
 a device frame;
 a support unit attached to the device frame and configured to support an object to be processed;
 a laser output unit attached to the device frame; and
 a laser converging unit attached to the device frame so as to be movable with respect to the laser output unit, wherein
 the laser output unit includes a laser light source configured to emit laser light, and
 the laser converging unit includes:
 a reflective spatial light modulator configured to reflect the laser light while modulating the laser light;
 a converging optical system configured to converge the laser light at the object to be processed;
 an imaging optical system constituting a double telecentric optical system in which a reflective surface of the reflective spatial light modulator and an entrance pupil plane of the converging optical system are in an imaging relationship; and
 a housing supporting the reflective spatial light modulator, the converging optical system, and the imaging optical system,
 wherein the housing is attached to the device frame so that the entire laser converging unit including the reflective spatial light modulator, the converging optical system, the imaging optical system and the housing are movable with respect to the laser output unit,
 a moving direction of the laser converging unit coincides with an emission direction of the laser light from the converging optical system,
 an optical path of the laser light from the reflective spatial light modulator to the imaging optical system is set along a predetermined plane perpendicular to the moving direction of the laser converging unit,
 the housing is provided with a light entrance unit configured to allow the laser light emitted from the laser output unit to enter the housing,
 the laser converging unit further includes a first mirror and a second mirror,
 the first mirror is arranged in the housing so as to face the light entrance unit in the moving direction of the laser converging unit, and is configured to reflect the laser light having entered the housing from the light entrance unit, toward the reflective spatial light modulator,
 the second mirror is configured to reflect the laser light having passed through the imaging optical system, toward the converging optical system,
 an optical path of the laser light from the reflective spatial light modulator via the imaging optical system to the second mirror is set along a predetermined plane perpendicular to the moving direction of the laser converging unit, and
 the laser output unit further includes:
 an output adjusting unit configured to adjust an output of the laser light emitted from the laser light source;
 a mirror unit configured to make the laser light having passed through the output adjusting unit incident on the light entrance unit along the moving direction of the laser converging unit; and
 a mounting base including a main surface on which the laser light source, the output adjusting unit, and the mirror unit are arranged, the main surface being perpendicular to the moving direction of the laser converging unit,
 wherein an optical path of the laser light from the laser light source via the output adjusting unit to the mirror unit is set along a plane parallel to the main surface.

2. The laser processing device according to claim 1, wherein an emission direction of the laser light from the laser output unit coincides with the moving direction of the laser converging unit.

3. The laser processing device according to claim 2, wherein the laser output unit further includes a laser light collimating unit configured to collimate the laser light.

4. The laser processing device according to claim 1, wherein the support unit is attached to the device frame so as to be movable along a plane perpendicular to the moving direction of the laser converging unit.

5. The laser processing device according to claim 4, wherein the support unit is attached to the device frame via a moving mechanism.

6. The laser processing device according to claim 1, wherein the laser output unit further includes a laser light collimating unit arranged on an optical path of the laser light from the output adjusting unit to the mirror unit and configured to collimate the laser light while adjusting a diameter of the laser light.

* * * * *